(12) United States Patent
Yang et al.

(10) Patent No.: US 12,412,269 B2
(45) Date of Patent: Sep. 9, 2025

(54) DEEP LEARNING IMAGE PROCESSING VIA REGION-WISE PARAMETER MAPS

(71) Applicant: GE Precision Healthcare LLC, Wauwatosa, WI (US)

(72) Inventors: Hongxu Yang, Utrecht (NL); Gopal Biligeri Avinash, Concord, CA (US); Lehel Mihály Ferenczi, Budapest (HU); Xiaomeng Dong, San Ramon, CA (US); Najib Akram Maheen Aboobacker, Thuckalay (IN); Gireesha Chinthamani Rao, Pewaukee, WI (US); Tao Tan, Eindhoven (NL); German Guillermo Vera Gonzalez, Menomonee Falls, WI (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 417 days.

(21) Appl. No.: 18/064,541

(22) Filed: Dec. 12, 2022

(65) Prior Publication Data
US 2024/0193761 A1   Jun. 13, 2024

(51) Int. Cl.
*G06T 7/00* (2017.01)
*G06T 3/4046* (2024.01)

(52) U.S. Cl.
CPC .......... *G06T 7/0012* (2013.01); *G06T 3/4046* (2013.01); *G06T 2207/20081* (2013.01);
(Continued)

(58) Field of Classification Search
CPC ................ G06T 7/0012; G06T 3/4046; G06T 2207/20081; G06T 2207/20084;
(Continued)

(56) References Cited

U.S. PATENT DOCUMENTS

| | | | |
|---|---|---|---|
| 2016/0350933 A1* | 12/2016 | Schieke | G16H 50/30 |
| 2022/0130499 A1* | 4/2022 | Zhou | G06V 10/25 |
| 2022/0215201 A1* | 7/2022 | Dwivedi | G06N 3/045 |

FOREIGN PATENT DOCUMENTS

WO   2020218967 A1   10/2020

OTHER PUBLICATIONS

Florkow M. C. et al.| "Deep learning-based MR-to-CT synthesis: The influence of varying gradient echo-based MR mages as input channels." Magn Reson Med. 2020; 83:1429-1441, DOI: 10.1002/mrm.28008, 13 pages.

* cited by examiner

*Primary Examiner* — Siamak Harandi
(74) *Attorney, Agent, or Firm* — Amin, Turocy & Watson, LLP

(57) ABSTRACT

Systems/techniques that facilitate improved deep learning image processing are provided. In various embodiments, a system can access a medical image, wherein pixels or voxels of the medical image can be allocated among a plurality of regions. In various aspects, the system can generate, via execution of a deep learning neural network on the medical image, a set of region-wise parameter maps, wherein a region-wise parameter map can consist of one predicted parameter per region of the medical image. In various instances, the system can generate a transformed version of the medical image by feeding the set of region-wise parameter maps to an analytical transformation function. In various cases, the system can render the transformed version of the medical image on an electronic display. In various aspects, the plurality of regions can be irregular or tissue-based.

20 Claims, 20 Drawing Sheets

(52) U.S. Cl.
CPC ............... *G06T 2207/20084* (2013.01); *G06T 2207/30004* (2013.01)

(58) Field of Classification Search
CPC ........... G06T 2207/30004; G06T 2207/10081; G06N 3/0464; G06N 3/08
See application file for complete search history.

DEEP LEARNING IMAGE PROCESSING VIA REGION-WISE PARAMETER MAPS

TECHNICAL FIELD

The subject disclosure relates generally to image processing, and more specifically to improved deep learning image processing.

BACKGROUND

When given a medical image, it can be desired to generate a transformed version of the medical image. Various existing techniques accomplish such transformation wholly analytically. Unfortunately, such techniques involve long, complicated processing chains that require extensive manual intervention and processing time. Other existing techniques accomplish such transformation via deep learning. Some of such existing deep learning techniques train a deep learning neural network to directly infer the transformed version of the medical image. Unfortunately, such techniques are prone to exacerbating visual artefacts in the medical image. Various others of such existing deep learning techniques train a deep learning neural network to infer pixel-wise or voxel-wise parameter maps for the medical image, and the transformed version of the medical image is obtained by feeding the medical image and such pixel-wise or voxel-wise parameter maps to a defined image-transfer-function. Unfortunately, such techniques are excessively computationally expensive, especially for high-resolution medical images.

Systems or techniques that can generate the transformed version of the medical image without involving a complicated processing chain that relies on manual intervention, without exacerbating visual artefacts, and without excessively consuming computational resources can be considered as desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate improved deep learning image processing are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access a medical image, wherein pixels or voxels of the medical image can be allocated among a plurality of regions. In various aspects, the computer-executable components can comprise an inference component that can generate, via execution of a deep learning neural network on the medical image, a set of region-wise parameter maps, wherein a region-wise parameter map can consist of one predicted parameter per region of the medical image. In various instances, the computer-executable components can comprise a transformation component that can generate a transformed version of the medical image by feeding the set of region-wise parameter maps to an analytical transformation function. In various cases, the computer-executable components can comprise a display component that can render the transformed version of the medical image on an electronic display. In various aspects, the plurality of regions can be irregular or tissue-based.

According to one or more embodiments, the above-described system can be implemented as a computer-implemented method or a computer program product.

DETAILED DESCRIPTION

Figure 1:
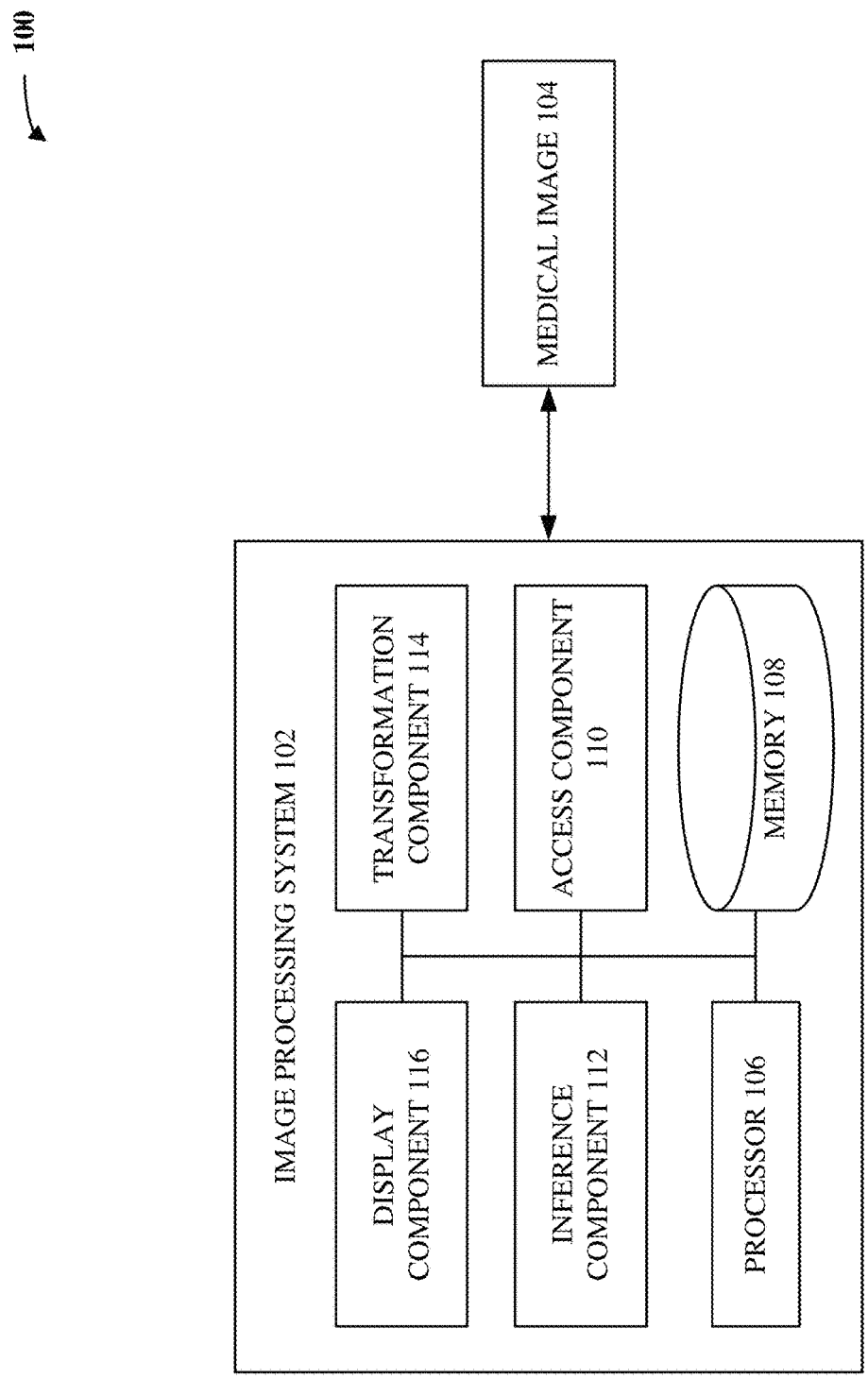
FIG. 1 illustrates a block diagram of an example, non-limiting system that facilitates improved deep learning image processing in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

When given a medical image (e.g., a computed tomography (CT) scanned image, a magnetic resonance imaging (MRI) scanned image, an X-ray scanned image, a positron emission tomography (PET) scanned image, an ultrasound scanned image), it can be desired to generate a transformed version of the medical image. For instance, it can be desired to generate a tissue-equalized version of the medical image, a brightness-contrast-enhanced version of the medical image, a denoised version of the medical image, or a modality-modified version of the medical image.

Various existing techniques generate the transformed version of the medical image wholly analytically. Unfortunately, such wholly analytical techniques involve long, complicated processing chains that require extensive manual intervention and processing time. For example, such wholly analytical techniques often rely upon the sequential application of myriad manually-crafted image processing filters, manually-tuned look-up tables, and manually-generated transformation templates or masks.

Other existing techniques generate the transformed version of the medical image via deep learning. Some of such existing deep learning techniques train a deep learning neural network to directly infer the transformed version of the medical image. That is, such techniques train the deep learning neural network to receive as input the medical image and to produce as output the transformed version of the medical image. Such direct image-to-image inference consumes less inferencing/processing time as compared to wholly analytical techniques. Unfortunately, however, such direct image-to-image inference is prone to exacerbating visual artefacts in the medical image. In other words, if the medical image exhibits any visual artefacts (e.g., optical distortions, features, misalignments, or shadows that are caused by improper image capture), and if the transformed version of the medical image is generated via direct image-to-image inference, then such visual artefacts can be not only present in the transformed version of the medical image, but can also be magnified, extended, or otherwise exaggerated in the transformed version of the medical image.

Various others of such existing deep learning techniques train a deep learning neural network to infer pixel-wise or voxel-wise parameter maps for the medical image, and the transformed version of the medical image is obtained by feeding the medical image and such pixel-wise or voxel-wise parameter maps to a defined image-transfer-function. In other words, such other existing deep learning techniques do not directly infer the transformed version of the medical image; they instead directly infer the pixel-wise or voxel-wise parameter maps, and the transformed version of the medical image is analytically obtained from such pixel-wise or voxel-wise parameter maps. Such parameter-based deep learning techniques are not prone to exacerbating visual artefacts, unlike direct image-to-image inference. Unfortunately, however, such parameter-based deep learning techniques are computationally expensive, especially for high-resolution medical images. Indeed, the deep learning neural network cannot generate pixel-wise or voxel-wise parameter maps without having a sufficiently large depth (e.g., a sufficiently large number of layers or neurons). Such large depth requires commensurately large computer memory space and computer processing capacity in order for the deep learning neural network to be electronically stored and executed. Moreover, as the number of pixels or voxels (e.g., resolution) of the medical image grows, so too must the depth of the deep learning neural network, thereby requiring even more computer memory space and computer processing capacity to be consumed.

Accordingly, systems or techniques that can generate the transformed version of the medical image without involving a complicated processing chain that relies on manual intervention, without exacerbating visual artefacts, and without excessively consuming computational resources can be considered as desirable.

Various embodiments described herein can address one or more of these technical problems. One or more embodiments described herein include systems, computer-implemented methods, apparatus, or computer program products that can facilitate improved deep learning image processing. More specifically, the inventors of various embodiments described herein devised various deep learning techniques for generating transformed versions of medical images, which deep learning techniques do not involve a time-consuming and manual-intervention-based processing chain, do not exacerbate visual artefacts of inputted medical images, and do not consume excessive amounts of computer memory space or computer processing capacity. More specifically still, the present inventors devised various embodiments for reducing the amount of computing resources consumed by techniques that generate transformed versions of medical images via parameter-based deep learning.

In particular, the present inventors recognized that existing parameter-based deep learning techniques for generating transformed versions of medical images consume large amounts of computational resources at least in part because such existing techniques train a deep learning neural network to generate one or more parameters per pixel or per voxel of an inputted medical image. So, because modern medical images often have tens of thousands, hundreds of thousands, or even millions of pixels or voxels, the deep learning neural network must, when such existing techniques are implemented, have commensurately many layers or neurons so as to output one or more parameters for each of such tens of thousands, hundreds of thousands, or even millions of pixels or voxels. This ultimately causes the deep learning neural network to have a large footprint (e.g., a large number of layers or neurons), which cannot be stored, trained, or executed without commensurately large amounts of computer memory space and computer processing capacity.

Fortunately, the present inventors realized that such overconsumption of computing resources can be ameliorated by configuring the deep learning neural network to instead output fewer than one parameter per pixel or per voxel. In particular, when given a medical image that is desired to be transformed, the pixels or voxels of the given medical image can be considered as being allocated or otherwise divvied among a plurality of regions, with each of the plurality of regions including more than one pixel or more than one voxel. Accordingly, there can be fewer regions than pixels or voxels. In any case, a deep learning neural network can, as described herein, be configured to receive the given medical image as input and to produce as output a set of region-wise parameter maps (not a set of pixel-wise or voxel-wise parameter maps), and a transformed version of the given medical image can be obtained by feeding the given medical image and such set of region-wise parameter maps to any suitable analytical transformation function. In various instances, each of the set of region-wise parameter maps can have one parameter per region. Contrast this with a pixel-wise or voxel-wise parameter map, which would instead have one parameter per pixel or per voxel. Because there can be fewer regions than pixels or voxels, a region-wise parameter map can have fewer parameters (e.g., can have a smaller dimensionality) than a pixel-wise or voxel-wise parameter map. Accordingly, because the deep learning neural network can be configured to generate region-wise parameter maps, the deep learning neural network can have fewer layers or fewer neurons than would be possible if the deep learning neural network were instead configured to generate pixel-wise or voxel-wise parameter maps. In other words, when various embodiments described herein are implemented, the deep learning neural network can exhibit a reduced footprint as compared to existing parameter-based deep learning techniques, and such reduced footprint can be stored, trained, or executed using commensurately fewer computational resources as compared to existing parameter-based deep learning techniques.

Furthermore, note that various embodiments described herein can generate the transformed version of the given medical image with comparable accuracy or precision as compared to existing parameter-based deep learning techniques, notwithstanding the reduced footprint of the deep learning neural network. In other words, when the deep learning neural network is configured to output region-wise parameter maps instead of pixel-wise or voxel-wise parameter maps, the deep learning neural network can take up less computer memory space and less computer processing capacity than would otherwise be possible. Yet, despite such reduced consumption of computer memory space and computer processing capacity, the transformed version of the medical image can nevertheless be generated with negligibly-different accuracy as compared to existing parameter-based deep learning techniques. In still other words, various embodiments described herein can achieve substantially the same image transformation accuracy/precision as existing parameter-based deep learning techniques, while consuming fewer computational resources than existing parameter-based deep learning techniques. Indeed, not only can various embodiments described herein reduce the footprint of parameter-based deep learning image transformation techniques without adversely affecting or otherwise significantly degrading accuracy, but such embodiments can do so without implementing other complicated error mitigation methodologies that are often used by existing parameter-based deep learning techniques. An example of such a complicated error mitigation methodology that is obsoleted by various embodiments described herein is application of variation constraints across pixel-wise or voxel-wise parameter maps.

Note that various embodiments described herein can be considered as counterintuitive or unexpected. Indeed, existing deep learning techniques generally teach that image transformation accuracy and neural network depth/complexity are directly proportional (as opposed to inversely proportional). Accordingly, it would have been expected that a significant reduction in neural network depth/complexity would cause a correspondingly significant reduction in image transformation accuracy. However, various embodiments described herein completely contravene this existing teaching. In other words, although a deep learning neural network that is configured to generate region-wise parameter maps can be significantly less deep/complex than one that is instead configured to generate pixel-wise or voxel-wise parameter maps, the present inventors realized that such deep learning neural network can nevertheless facilitate image transformation substantially as accurately (e.g., with negligible accuracy degradation) as one that is instead configured to generate pixel-wise or voxel-wise parameter maps. In still other words, implementation of region-wise parameter maps as described herein can cause a sizeable reduction in network depth/complexity without also causing a correspondingly sizeable reduction in image transformation accuracy, contrary to existing teachings.

Various embodiments described herein can be considered as a computerized tool (e.g., any suitable combination of computer-executable hardware or computer-executable software) that can facilitate improved deep learning image processing. In various aspects, such computerized tool can comprise an access component, an inference component, a transformation component, or a display component.

In various embodiments, there can be a medical image. In various aspects, the medical image can depict one or more anatomical structures (e.g., tissues, organs, body parts, or portions thereof) of a medical patient (e.g., human, animal, or otherwise). In various instances, the medical image can exhibit any suitable size, format, or dimensionality (e.g., can be a two-dimensional pixel array, can be a three-dimensional voxel array). In various cases, the medical image can be generated or otherwise captured by any suitable medical imaging modality (e.g., by a CT scanner, by an MRI scanner, by an X-ray scanner, by a PET scanner, or by an ultrasound scanner). In various aspects, the medical image can have undergone any suitable image reconstruction technique (e.g., filtered back projection).

In any case, the pixels or voxels of the medical image can be considered as being allocated, divvied, divided, or otherwise assigned respectively among a plurality of regions. In various aspects, each given pixel or voxel of the medical image can be assigned to only one of the plurality of regions. Moreover, in various instances, each given region can have two or more pixels or voxels assigned to it. Accordingly, the total number of regions can be lesser than the total number of pixels or voxels in the medical image. In other words, each of the plurality of regions can be a strict subset of the pixels or voxels of the medical image, with each strict subset having a cardinality greater than one, and where such strict subsets are disjoint (e.g., non-overlapping) with each other.

In various aspects, a region of the medical image can be considered as any suitable contiguous cluster of pixels or voxels. That is, more than one pixel or voxel can be assigned to that region, and any two pixels or voxels that are assigned to that region can be either: adjacent to each other (e.g., within one row and one column of each other); or coupled to each other by an unbroken chain of other pixels or voxels, where every pixel or voxel of such unbroken chain is also assigned to that region, and where each consecutive pair of pixels or voxels in such unbroken chain are adjacent to each other. In various other aspects, a region of the medical image can be non-contiguous. That is, a region can be considered as comprising two or more distinct contiguous clusters of pixels or voxels, which two or more distinct contiguous clusters are spatially apart or otherwise not touching each other. In other words, there can be two pixels or voxels assigned to that region, where such two pixels or voxels are: not adjacent to each other; and not coupled to each other by any unbroken chain of other consecutively adjacent pixels or voxels that are also assigned to that region. In various cases, some of the plurality of regions can be contiguous while others of the plurality of regions can be non-contiguous.

In various aspects, a region of the medical image can exhibit any suitable shape (if the region is contiguous) or shapes (if the region is non-contiguous). For instance, a region can include more than one pixel or voxel of the medical image, which more than one pixel or voxel can collectively form (due to their spatial positions or locations within the medical image) any suitable regular or convex polygonal shape (e.g., square, rectangle). In other instances, a region can include more than one pixel or voxel of the medical image, which more than one pixel or voxel can collectively form (due to their spatial positions or locations within the medical image) any suitable irregular or non-convex polygonal shape. In various cases, different regions can have the same or different shapes as each other.

In various aspects, a region can be defined by any suitable interval or bin of pixel or voxel intensity values. For example, for any suitable positive real numbers a<b<c, all pixels of the medical image that have an intensity value greater than or equal to a and less than b can belong to one region of the plurality of regions, and all pixels of the medical image that have an intensity value greater than or equal to b and less than c can belong to another region of the plurality of regions. In various cases, different regions can be defined by different, distinct, disjoint, or otherwise non-overlapping intensity intervals or bins.

In various aspects, a region can be defined or otherwise based on a type of tissue that is depicted in the medical image. For example, suppose that the medical image illustrates d unique types of tissue (e.g., bone tissue, lung tissue, skin tissue, skeletal muscle tissue, cardiac muscle tissue) for any suitable positive integer d>1. In such case, the plurality of regions can comprise d+1 regions: one unique region for each of such d unique types of tissue, and one unique region for all pixels or voxels that belong to none of such d unique types of tissue. In various instances, such d unique types of tissue can be identified in any suitable fashion. For example, in some cases, a pre-trained tissue segmentation model can be executed on the medical image, and such pre-trained tissue segmentation model can produce as output a segmentation mask that indicates which pixels or voxels of the medical image belong to which of the d unique types of tissue.

No matter their shapes, no matter their contiguities, and no matter how they are otherwise defined (e.g., based on intensity bins or tissue types), the plurality of regions can be considered as collectively forming the medical image. In other words, the union of the plurality of regions can be equal to the medical image. In still other words, the plurality of regions can fit together like the pieces of a jigsaw puzzle to collectively yield the medical image.

In any case, it can be desired to perform any suitable transformation on the medical image. Non-limiting examples of such transformation can include tissue-equalization (e.g., reconciling pixel or voxel intensities across different tissue types shown in a medical image), brightness-contrast enhancement (e.g., altering the brightness or contrast level of a medical image), image denoising (e.g., reducing an amount of visual noise exhibited by a medical image), or modality modification (e.g., generating a synthetic CT image from a real MRI image, generating a synthetic MRI image from a real CT image). In various aspects, the computerized tool described herein can facilitate such transformation with respect to the medical image.

In various embodiments, the access component of the computerized tool can electronically receive or otherwise electronically access the medical image. In some aspects, the access component can electronically retrieve the medical image from any suitable centralized or decentralized data structures (e.g., graph data structures, relational data structures, hybrid data structures), whether remote from or local to the access component. For example, the access component can retrieve the medical image from whatever medical imaging device generated or captured the medical image. In any case, the access component can electronically obtain or access the medical image, such that other components of the computerized tool can electronically interact with (e.g., read, write, edit, copy, manipulate) the medical image.

In various embodiments, the inference component of the computerized tool can electronically store, maintain, control, or otherwise access a deep learning neural network. In various instances, the deep learning neural network can exhibit any suitable internal architecture. For example, the deep learning neural network can include any suitable numbers of any suitable types of layers (e.g., input layer, one or more hidden layers, output layer, any of which can be convolutional layers, dense layers, non-linearity layers, pooling layers, batch normalization layers, or padding layers). As another example, the deep learning neural network can include any suitable numbers of neurons in various layers (e.g., different layers can have the same or different numbers of neurons as each other). As yet another example, the deep learning neural network can include any suitable activation functions (e.g., softmax, sigmoid, hyperbolic tangent, rectified linear unit) in various neurons (e.g., different neurons can have the same or different activation functions as each other). As still another example, the deep learning neural network can include any suitable interneuron connections or interlayer connections (e.g., forward connections, skip connections, recurrent connections).

In any case, the deep learning neural network can be configured, as described herein, to receive as input medical images and to produce as output region-wise parameter maps. Accordingly, the inference component can electronically execute the deep learning neural network on the medical image, thereby yielding a set of region-wise parameter maps corresponding to the medical image. More specifically, the inference component can feed the medical image to an input layer of the deep learning neural network, the medical image can complete a forward pass through one or more hidden layers of the deep learning neural network, and an output layer of the deep learning neural network can compute the set of region-wise parameter maps based on activations generated by the one or more hidden layers.

In various aspects, the set of region-wise parameter maps can include any suitable number of region-wise parameter maps. In various instances, a region-wise parameter map can be any suitable electronic data (e.g., a vector, a matrix, a tensor) that indicates, specifies, or otherwise represents parameters (e.g., scalar coefficients having any suitable magnitudes) that respectively correspond (e.g., in one-to-one fashion) to the plurality of regions. In other words, a region-wise parameter map can contain, include, comprise, or consist of one unique or distinct parameter (e.g., one scalar coefficient) per unique or distinct region of the medical image. Contrast this with a pixel-wise or voxel-wise parameter map, which would instead indicate, specify, or otherwise represent parameters that respectively correspond to the pixels or voxels of the medical image (e.g., which would instead have one unique or distinct parameter per each unique or distinct pixel or voxel of the medical image). That is, a region-wise parameter map that corresponds to the medical image can have fewer parameters (e.g., can have a smaller dimensionality) than a pixel-wise or voxel-wise parameter map that corresponds to the medical image.

As a non-limiting example, suppose that the medical image is a 200-by-200 array of pixels, and suppose that each disjoint 10-by-10 block of pixels is considered a region of the medical image. In such case, the medical image can have 40,000 total pixels (e.g., 200×200=40,000), and the medical image can have 400 total regions (e.g., since each region can be a disjoint 10-by-10 block of pixels, there can be 20 rows and 20 columns of such 10-by-10 blocks in the medical image; 20×20=400). Accordingly, a pixel-wise parameter map in such case would be a vector, matrix, or tensor having 40,000 parameters (e.g., one per pixel), whereas a region-wise parameter map in such case would instead be a vector, matrix, or tensor having only 400 parameters (e.g., one per region). That is, in this non-limiting example, such region-wise parameter map can have two orders of magnitude fewer parameters than the pixel-wise parameter map.

Because a region-wise parameter map corresponding to the medical image can have fewer parameters (e.g., multiple orders of magnitude fewer parameters, in some cases) than a pixel-wise or voxel-wise parameter map corresponding to the medical image, the set of region-wise parameter maps can likewise collectively have fewer parameters (e.g., multiple orders of magnitude fewer parameters, in some cases) than an analogous set of pixel-wise or voxel-wise parameter maps. Accordingly, because the deep learning neural network can be configured to output the set of region-wise parameter maps, the deep learning neural network can have fewer layers or neurons (e.g., multiple orders of magnitude fewer layers or neurons, in some cases), as compared to a situation in which the deep learning neural network were instead configured to generate an analogous set of pixel-wise or voxel-wise parameter maps. In other words, the footprint of the deep learning neural network can be reduced (e.g., by multiple orders of magnitude, in some cases) by configuring the deep learning neural network to output the set of region-wise parameters instead of an analogous set of pixel-wise or voxel-wise parameter maps.

In various embodiments, the transformation component of the computerized tool can electronically generate a transformed version of the medical image by feeding the medical image and the set of region-wise parameter maps to an analytical transformation function. More specifically, the analytical transformation function can include any suitable number of any suitable types of mathematical operators (e.g., polynomial operators, logarithmic operators, exponential operators, trigonometric operators) that can be combined in any suitable fashion (e.g., that can be combined multiplicatively or additively). Regardless of the specific mathematical operators implemented, the analytical transformation function can take as arguments any given pixel or voxel of the medical image as well as, from each of the set of region-wise parameter maps, a parameter corresponding to whatever region to which the given pixel or voxel is assigned, and the analytical transformation function can produce as output a transformed pixel or voxel. In other words, the analytical transformation function can update the value of any pixel or voxel of the medical image, based on the current value of the pixel or voxel and further based on one parameter from each of the set of region-wise parameter maps. In any case, the analytical transformation function can be applied in this fashion to each pixel or voxel of the medical image, thereby yielding the transformed version of the medical image. Note that this can cause the transformed version of the medical image to have the same format, size, or dimensionality (e.g., the same number or arrangement of pixels or voxels) as the medical image itself. In other words, the analytical transformation function can change the intensity values of the pixels or voxels of the medical image, but can leave unchanged the positions, locations, or arrangement of the pixels or voxels of the medical image.

In various embodiments, the display component of the computerized tool can electronically render, on any suitable electronic display (e.g., computer screen, computer monitor, graphical user-interface), the transformed version of the medical image. Thus, a user, technician, or medical professional can visually inspect or view the transformed version of the medical image as rendered on the electronic display, which can aid the user, technician, or medical professional in making a diagnosis or prognosis. Furthermore, in various aspects, the display component can electronically render, on the electronic display, any of the set of region-wise parameter maps. Accordingly, the user, technician, or medical professional can visually inspect such region-wise parameter maps, which can also aid in making a diagnosis or prognosis.

To help cause the set of region-wise parameter maps to be accurate or correct, the deep learning neural network can first undergo any suitable type or paradigm of training (e.g., supervised training, unsupervised training, reinforcement learning). Accordingly, in various aspects, the access component can receive, retrieve, or access a training dataset, and the computerized tool can comprise a training component that can train the deep learning neural network on the training dataset.

In various aspects, the training dataset can comprise a plurality of training medical images. In various instances, a training medical image can have the same size, format, or dimensionality (e.g., the same number or arrangement of pixels or voxels) as the medical image discussed above. For example, if the medical image is a two-dimensional pixel array that depicts an anatomical structure of a medical patient, then each training medical image can likewise be a two-dimensional pixel array that depicts a respective anatomical structure of a respective medical patient. As another example, if the medical image is a three-dimensional voxel array that depicts an anatomical structure of a medical patient, then each training medical image can likewise be a three-dimensional voxel array that depicts a respective anatomical structure of a respective medical patient.

In any case, each training medical image can be considered as corresponding to the plurality of regions discussed above. That is, the pixels or voxels of each training medical image can be considered as being allocated, divvied, divided, or otherwise assigned among the same number of regions as the pixels or voxels of the medical image discussed above. For example, suppose that the pixels or voxels of the medical image discussed above are allocated among h regions for any suitable positive integer h>1. In such case, the pixels of voxels of each training medical image can likewise be allocated among such h regions. That is, the medical image can be considered as having a first region, and each training medical image can also be considered as having a respective first region. Similarly, the medical image can be considered as having an h-th region, and each training medical image can also be considered as having a respective h-th region.

Note that, in some instances, the regions of any given training medical image can have identically-positioned pixels or voxels as respective regions of the medical image discussed above. For example, if a g-th region of the medical image comprises the pixels that are located in rows i to j and in columns k to l of the medical image for any suitable positive integers $g \le h$, $i<j$, and $k<l$, then the g-th region of the given training medical image can likewise comprise the pixels that are located in rows i to j and in columns k to l of that given training medical image.

However, note that, in other instances, the regions of any given training medical image can have non-identically-positioned pixels or voxels as respective regions of the medical image discussed above. For example, if the g-th region of the medical image comprises all pixels of the medical image that are within a given intensity bin, then the g-th region of the given training medical image can likewise comprise all pixels of that given training medical image that are within that given intensity bin. But, because the intensity value distribution of the medical image can differ from the intensity distribution of that given training medical image, the pixels of that given training medical image that fall within that given intensity bin might be in different locations as compared to the pixels of the medical image that fall within that given intensity bin. Indeed, a different number of pixels of the given training medical image might fall within that given intensity bin as compared to the pixels of the medical image. As another example, if the g-th region of the medical image comprises all pixels of the medical image that belong to a particular tissue type, then the g-th region of the given training medical image can likewise comprise all pixels of that given training medical image that belong to that particular tissue type. But, because the anatomical structures depicted by the medical image can differ from those depicted by the given training medical image, the pixels of that given training medical image that belong to that particular tissue type might be in different locations as compared to the pixels of the medical image that belong to that specific tissue type. Indeed, a different number of pixels of the given training medical image might belong to that particular tissue type as compared to the pixels of the medical image.

In any case, the training dataset can comprise the plurality of training medical images.

In various aspects, the training dataset can comprise a plurality of sets of ground-truth region-wise parameter maps that respectively correspond to the plurality of training medical images. In various instances, a set of ground-truth region-wise parameter maps can have the same size, format, or dimensionality as the set of region-wise parameter maps discussed above. In other words, a set of ground-truth region-wise parameter maps can be considered as indicating or representing the correct or accurate region-wise parameter maps that are known or deemed to correspond to a respective training medical image.

In various cases, the training dataset can comprise a plurality of ground-truth transformed medical images that respectively correspond to the plurality of training medical images. In various aspects, a ground-truth transformed medical image can have the same size, format, or dimensionality (e.g., the same number or arrangement of pixels or voxels) as the transformed version of the medical image discussed above. In other words, each ground-truth transformed medical image can be considered as indicating or representing a transformed version (e.g., tissue-equalized version, brightness-contrast-enhanced version, denoised-version, modality-modified version) of a respective training medical image, which transformed version is known or deemed to be correct or accurate.

In various aspects, the training component can perform supervised training on the deep learning neural network, based on the training dataset. Prior to the start of such supervised training, the trainable internal parameters (e.g., weights, biases, convolutional kernels) of the deep learning neural network can be randomly initialized.

In various aspects, the training component can select from the training dataset any suitable training medical image, any suitable set of ground-truth region-wise parameters corresponding to such selected training medical image, and any suitable ground-truth transformed medical image corresponding to such selected training medical image. In various instances, the training component can feed the selected training medical image to the deep learning neural network, which can cause the deep learning neural network to produce a first output. For example, the training component can feed the training medical image to an input layer of the deep learning neural network, the training medical image can complete a forward pass through one or more hidden layers of the deep learning neural network, and an output layer of the deep learning neural network can calculate the first output based on activations from the one or more hidden layers. Note that, in various cases, the size, format, or dimensionality of the first output can be controlled or otherwise determined by the number or arrangement of neurons in the output layer (e.g., the first output can be forced to have a desired size, format, or dimensionality, by adding neurons to or removing neurons from the output layer of the deep learning neural network).

In various aspects, the first output can be considered as the set of predicted or inferred region-wise parameter maps that the deep learning neural network believes should correspond to the selected training medical image. In contrast, the selected set of ground-truth region-wise parameter maps can be considered as the correct or accurate region-wise parameter maps that are known or otherwise deemed to correspond to the selected training medical image. Note that, if the deep learning neural network has so far undergone no or little training, then the first output can be highly inaccurate (e.g., can be very different from the selected set of ground-truth region-wise parameter maps).

In various instances, the training component can generate a second output, by feeding both the selected training medical image and the first output to the analytical transformation function. More specifically, the second output can be considered as a predicted or inferred transformed version (e.g., predicted or inferred tissue-equalized version, predicted or inferred brightness-contrast-enhanced version, predicted or inferred denoised version, predicted or inferred modality-modified version) of the selected training medical image. In contrast, the selected ground-truth transformed medical image can be considered as the correct or accurate transformed version (e.g., correct or accurate tissue-equalized version, correct or accurate brightness-contrast-enhanced version, correct or accurate denoised version, correct or accurate modality-modified version) that is known or otherwise deemed to correspond to the selected training medical image. Note that, if the deep learning neural network has so far undergone no or little training, then the second output can be highly inaccurate (e.g., can be very different from the selected ground-truth transformed medical image).

In various aspects, the training component can compute any suitable error or loss (e.g., mean absolute error (MAE), mean squared error (MSE), cross-entropy) between the first output and the selected set of ground-truth region-wise parameter maps. Likewise, the training component can compute any suitable error or loss (e.g., MAE, MSE, cross-entropy) between the second output and the selected ground-truth transformed medical image. Accordingly, the training component can update the trainable internal parameters (e.g., weights, biases, convolutional kernels) of the deep learning neural network by performing backpropagation (e.g., stochastic gradient descent) driven by such computed errors or losses.

In various instances, such supervised training procedure can be repeated for each training medical image in the training dataset, with the result being that the trainable internal parameters of the deep learning neural network can become iteratively optimized to accurately generate region-wise parameter maps for inputted medical images. In various cases, the training component can implement any suitable training batch sizes, any suitable training termination criteria, or any suitable error, loss, or objective functions.

Note that, in some aspects, the training dataset can lack the plurality of sets of ground-truth region-wise parameter maps. In such case, there can be no selected set of ground-truth region-wise parameter maps, but there can still be the selected ground-truth transformed medical image. Accordingly, backpropagation can be driven by any computed errors or losses between the second output and the selected ground-truth transformed medical image. Conversely, note that, in other aspects, the training dataset can lack the plurality of ground-truth transformed medical images. In such case, there can be no selected ground-truth medical image, but there can still be the selected set of ground-truth region-wise parameter maps. Accordingly, backpropagation can be driven by any computed errors or losses between the first output and the selected set of ground-truth region-wise parameter maps (e.g., in such case, there can be no need to apply the analytical transformation function during training).

In any case, configuring the deep learning neural network to output region-wise parameter maps can cause the deep learning neural network to have a smaller footprint (e.g., fewer layers or fewer neurons, sometimes multiple orders of magnitude fewer) than the deep learning neural network would have if it were instead configured to output pixel-wise or voxel-wise parameter maps. Nevertheless, despite such reduced footprint, the present inventors have experimentally verified that, when trained to output region-wise parameter maps as described herein, the deep learning neural network can facilitate image transformation with comparable accuracy (e.g., with at most negligible or insignificant accuracy degradation) as the deep learning neural network would be able to provide if it were instead configured to output pixel-wise or voxel-wise parameter maps. In other words, various embodiments described herein can facilitate image transformation with a significantly reduced deep learning footprint, but without a correspondingly significant reduction in accuracy/precision.

Various embodiments described herein can be employed to use hardware or software to solve problems that are highly technical in nature (e.g., to facilitate improved deep learning image processing), that are not abstract and that cannot be performed as a set of mental acts by a human. Further, some of the processes performed can be performed by a specialized computer (e.g., a deep learning neural network having trainable internal parameters such as convolutional kernels) for carrying out defined acts related to improved deep learning image processing. For example, such defined acts can include: accessing, by a device operatively coupled to a processor, a medical image, wherein pixels or voxels of the medical image are allocated among a plurality of regions; generating, by the device and via execution of a deep learning neural network on the medical image, a set of region-wise parameter maps, wherein a region-wise parameter map consists of one predicted parameter per region of the medical image; generating, by the device, a transformed version of the medical image by feeding the set of region-wise parameter maps to an analytical transformation function; and rendering, by the device, the transformed version of the medical image on an electronic display.

Such defined acts are not performed manually by humans. Indeed, neither the human mind nor a human with pen and paper can electronically access a medical image (e.g., a CT scanned image, an MRI scanned image, an X-ray scanned image), electronically execute a deep learning neural network on the medical image so as to generate region-wise parameter maps (as opposed to pixel-wise or voxel-wise parameter maps), electronically use the region-wise parameter maps to generate a transformed version the medical image, and electronically display such transformed version of the medical image on a computer screen. Indeed, a deep learning neural network is an inherently-computerized construct that simply cannot be implemented in any way by the human mind without computers. Similarly, medical images are inherently computerized constructs that are generated or captured by electronic medical hardware (e.g., CT scanners, MRI scanners, X-ray scanners, PET scanners, ultrasound scanners) and not in any way by the human mind without computers. Accordingly, a computerized tool that can train or execute a deep learning neural network to produce transformed versions of medical images is likewise inherently-computerized and cannot be implemented in any sensible, practical, or reasonable way without computers.

Moreover, various embodiments described herein can integrate into a practical application various teachings relating to improved deep learning image processing. As explained above, it can be desired to perform a transformation (e.g., tissue-equalization, brightness-contrast enhancement, denoising, modality-modification) on a medical image. Some existing techniques perform such transformation wholly analytically. Such existing techniques consume excessive processing time and require extensive amounts of manual intervention. Other existing techniques perform such transformation via direct image-to-image deep learning inference. Such existing techniques consume less time than wholly analytical techniques, but they are likely to worsen visual artefacts. Yet other existing techniques perform such transformation via deep learning generation of pixel-wise or voxel-wise parameter maps. Such existing techniques consume less time than wholly analytical techniques and are less likely to worsen visual artefacts as compared to direct image-to-image deep learning techniques. However, such existing techniques consume large amounts of computer memory space and computer processing capacity.

Various embodiments described herein can address one or more of these technical problems. Specifically, the present inventors realized that existing parameter-based deep learning techniques consume excessive amounts of computer memory space and computer processing capacity at least in part because such techniques configure a deep learning neural network to generate one or more parameters per pixel or per voxel. Accordingly, since medical images often have tens of thousands, hundreds of thousands, or even millions of voxels, such techniques require the deep learning neural network to have a commensurately large footprint (e.g., commensurately many layers or neurons) in order to generate one or more parameters for each of such very many pixels or voxels. The present inventors realized that this issue can be addressed by training the deep learning neural network to generate region-wise parameter maps instead of pixel-wise or voxel-wise parameter maps. Indeed, as described herein, the pixels or voxels of a medical image can be considered as being assigned among a plurality of regions, where each region has two or more pixels assigned to it, and where each pixel is assigned to only one region. Accordingly, there can be fewer regions than pixels or voxels (e.g., in various cases, orders of magnitude fewer). Thus, a deep learning neural network that is configured to produce region-wise parameter maps can have a smaller footprint (e.g., in various cases, orders of magnitude smaller) than a deep learning neural network that is instead configured to produce pixel-wise or voxel-wise parameter maps. Such reduced footprint can be electronically stored, trained, or executed with commensurately less computer memory space or computer processing capacity. Moreover, the present inventors experimentally verified that such reduction in footprint can be implemented without significant degradation of image transformation accuracy, which is contrary to existing teachings that emphasize direct proportionality between deep learning footprint and image transformation accuracy. Accordingly, various embodiments described herein can be considered as performing image transformation with a reduced deep learning footprint but without a correspondingly reduced image transformation accuracy. Such embodiments certainly constitute concrete and tangible technical improvements in the field of image processing, and thus such embodiments clearly qualify as useful and practical applications of computers.

Furthermore, various embodiments described herein can control real-world tangible devices based on the disclosed teachings. For example, various embodiments described herein can electronically execute (or train) real-world deep learning neural networks on real-world medical images (e.g., CT images, MRI images, X-ray images, PET images, ultrasound images), and can electronically render any results produced by such real-world deep learning neural networks on real-world computer screens.

It should be appreciated that the herein figures and description provide non-limiting examples of various embodiments and are not necessarily drawn to scale.

FIG. 1 illustrates a block diagram of an example, non-limiting system 100 that can facilitate improved deep learning image processing in accordance with one or more embodiments described herein. As shown, an image processing system 102 can be electronically integrated, via any suitable wired or wireless electronic connection, with a medical image 104.

In various embodiments, the medical image 104 can depict any suitable anatomical structure of any suitable medical patient. As some non-limiting examples, the anatomical structure can be any suitable tissue of the medical patient (e.g., bone tissue, lung tissue, muscle tissue, brain tissue), any suitable organ of the medical patient (e.g., heart, liver, lung, brain, eye, colon, blood vessel), any suitable bodily fluid of the medical patient (e.g., blood, amniotic fluid), any other suitable body part of the medical patient, or any suitable portion thereof.

In various aspects, the medical image 104 can exhibit any suitable format, size, or dimensionality. As a non-limiting example, the medical image 104 can be an x-by-y array of pixels, for any suitable positive integers x and y. As another non-limiting example, the medical image 104 can be an x-by-y-by-z array of voxels for any suitable positive integers x, y, and z.

In various instances, the medical image 104 can be generated or otherwise captured by any suitable medical imaging device, medical imaging equipment, or medical imaging modality (not shown). As a non-limiting example, the medical image 104 can be generated or otherwise captured by a CT scanner, in which case the medical image 104 can be considered as a CT scanned image. As another non-limiting example, the medical image 104 can be generated or otherwise captured by an MRI scanner, in which case the medical image 104 can be considered as an MRI scanned image. As yet another non-limiting example, the medical image 104 can be generated or otherwise captured by a PET scanner, in which case the medical image 104 can be considered as a PET scanned image. As still another non-limiting example, the medical image 104 can be generated or otherwise captured by an X-ray scanner, in which case the medical image 104 can be considered as an X-ray scanned image. As even another non-limiting example, the medical image 104 can be generated or otherwise captured by an ultrasound scanner, in which case the medical image 104 can be considered as an ultrasound scanned image. Moreover, the medical image 104 can have undergone any suitable image reconstruction techniques, such as filtered back projection.

In various embodiments, the medical image 104 can be considered as being made up of a plurality of regions. In other words, the pixels or voxels of the medical image 104 can be considered being assigned, allocated, or otherwise divvied up among the plurality of regions, such that each region can be considered as a subset of the pixels or voxels of the medical image. In various aspects, each pixel or voxel can be assigned to one and only one of the plurality of regions. Moreover, in various instances, each region can have two or more pixels or voxels assigned to it. Therefore, the cardinality of the plurality of regions can be lesser than the cardinality of the pixels or voxels in the medical image 104. In other words, there can be fewer regions than pixels or voxels.

In various embodiments, it can be desired to perform any suitable image transformation on the medical image 104. As a non-limiting example, the image transformation can be tissue equalization, which can involve reconciling or smoothing pixel or voxel intensity values across different tissue types shown in the medical image 104. As another non-limiting example, the image transformation can be brightness-contrast enhancement, which can involve controllably altering (e.g., controllably increasing or decreasing) the brightness level or contrast level of the medical image 104. As yet another non-limiting example, the image transformation can be denoising, which can involve reducing an amount of visual or optical noise present in the medical image 104. As still another non-limiting example, the image transformation can be modality-modification, which can involve generating a version of the medical image 104 whose visual characteristics are in accordance with a different imaging modality than that which was used to generate or capture the medical image 104.

In any case, the image processing system 102 can, as described herein, perform the image transformation on the medical image 104.

In various embodiments, the image processing system 102 can comprise a processor 106 (e.g., computer processing unit, microprocessor) and a non-transitory computer-readable memory 108 that is operably or operatively or communicatively connected or coupled to the processor 106. The non-transitory computer-readable memory 108 can store computer-executable instructions which, upon execution by the processor 106, can cause the processor 106 or other components of the image processing system 102 (e.g., access component 110, inference component 112, transformation component 114, display component 116) to perform one or more acts. In various embodiments, the non-transitory computer-readable memory 108 can store computer-executable components (e.g., access component 110, inference component 112, transformation component 114, display component 116), and the processor 106 can execute the computer-executable components.

In various embodiments, the image processing system 102 can comprise an access component 110. In various aspects, the access component 110 can electronically receive or otherwise electronically access the medical image 104. In various instances, the access component 110 can electronically retrieve the medical image 104 from any suitable centralized or decentralized data structures (not shown) or from any suitable centralized or decentralized computing devices (not shown). As a non-limiting example, whatever medical imaging device, equipment, or modality (e.g., CT scanner, MRI scanner, X-ray scanner, PET scanner, ultrasound scanner) that generated or captured the medical image 104 can transmit the medical image 104 to the access component 110. In any case, the access component 110 can electronically obtain or access the medical image 104, such that other components of the image processing system 102 can electronically interact with the medical image 104.

In various embodiments, the image processing system 102 can comprise an inference component 112. In various aspects, as described herein, the inference component 112 can execute a deep learning neural network on the medical image 104, thereby yielding a set of region-wise parameter maps.

In various embodiments, the image processing system 102 can comprise a transformation component 114. In various instances, as described herein, the transformation component 114 can generate a transformed version of the medical image, by applying an analytical transformation function to the set of region-wise parameter maps.

In various embodiments, the image processing system 102 can comprise a display component 116. In various cases, as described herein, the display component 116 can render the transformed version of the medical image or any of the set of region-wise parameter maps on any suitable electronic display.

Figure 2:
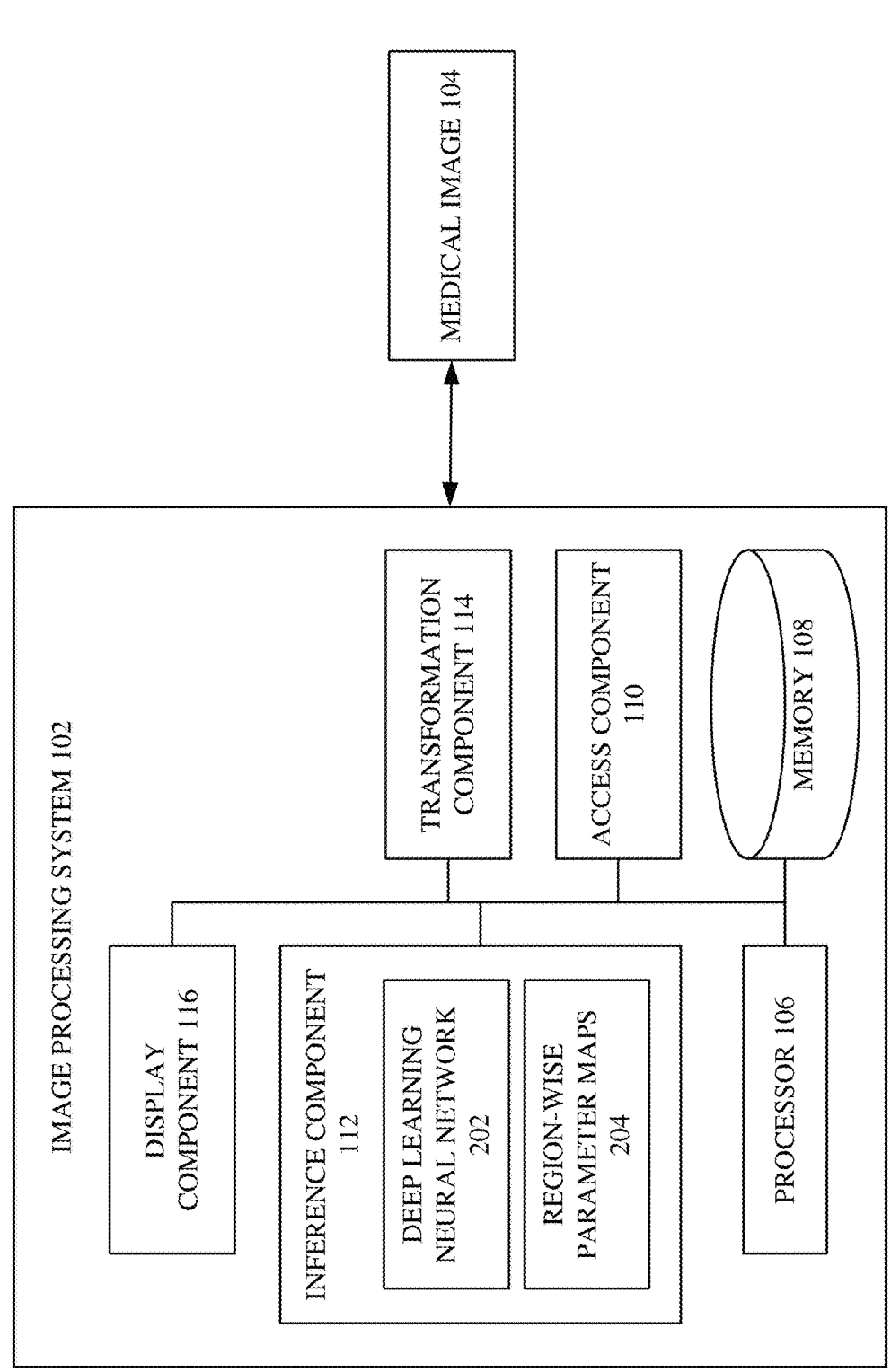
FIG. 2 illustrates a block diagram of an example, non-limiting system including a deep learning neural network and a set of region-wise parameter maps that facilitates improved deep learning image processing in accordance with one or more embodiments described herein.

FIG. 2 illustrates a block diagram of an example, non-limiting system 200 including a deep learning neural network and a set of region-wise parameter maps that can facilitate improved deep learning image processing in accordance with one or more embodiments described herein. As shown, the system 200 can, in some cases, comprise the same components as the system 100, and can further comprise a deep learning neural network 202 and a set of region-wise parameter maps 204.

In various embodiments, the inference component 112 can electronically store, electronically maintain, electronically control, or otherwise electronically access the deep learning neural network 202. In various aspects, the deep learning neural network 202 can have or otherwise exhibit any suitable internal architecture. For instance, the deep learning neural network 202 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable internal parameters can be convolutional kernels. As another example, any of such input layer, one or more hidden layers, or output layer can be dense layers, whose learnable or trainable internal parameters can be weight matrices or bias values. As still another example, any of such input layer, one or more hidden layers, or output layer can be batch normalization layers, whose learnable or trainable internal parameters can be shift factors or scale factors. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

In various aspects, the inference component 112 can electronically execute the deep learning neural network 202 on the medical image 104, and such execution can cause the deep learning neural network 202 to produce the set of region-wise parameter maps 204. Various non-limiting aspects are further described with respect to FIG. 3.

Figure 3:
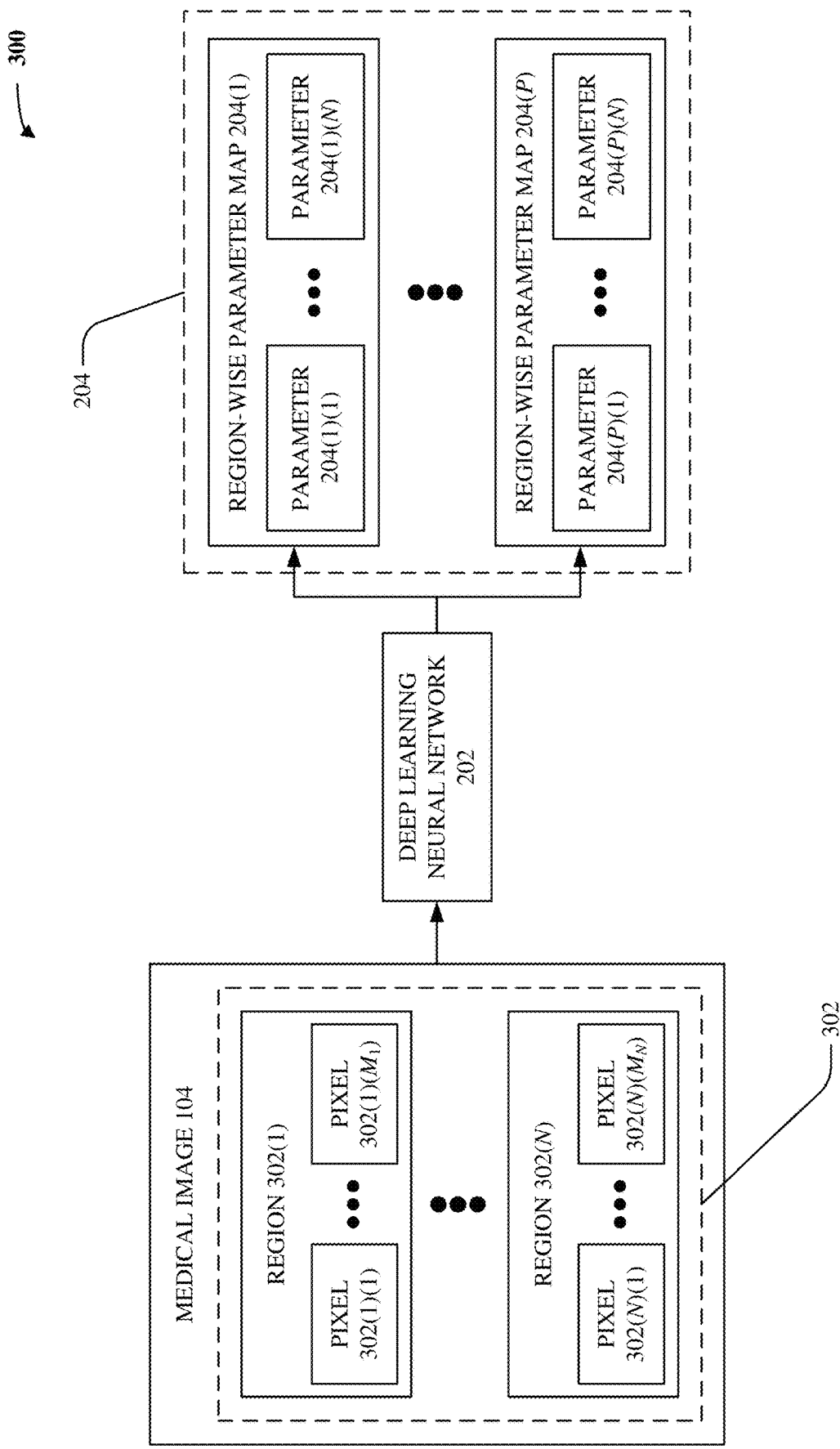
FIG. 3 illustrates an example, non-limiting block diagram showing how a deep learning neural network can generate a set of region-wise parameter maps in accordance with one or more embodiments described herein.

FIG. 3 illustrates an example, non-limiting block diagram 300 showing how the deep learning neural network 202 can generate the set of region-wise parameter maps 204 in accordance with one or more embodiments described herein.

In various aspects, as shown, the medical image 104 can be considered as comprising or otherwise being made up of a plurality of regions 302. The plurality of regions 302 can comprise n regions for any suitable positive integer n>1: a region 302(1) to a region 302(n). In various instances, the pixels or voxels of the medical image 104 can be allocated among the plurality of regions 302.

For ease of explanation and illustration, and without loss of generality, the figures hereinafter treat the medical image 104 as a two-dimensional array of pixels. But note that this is a mere non-limiting example and that the herein teachings are equally applicable even if the medical image 104 were instead a three-dimensional array of voxels.

In various aspects, the pixels of the medical image 104 can be allocated or assigned among the plurality of regions 302, such that each pixel is allocated or assigned to exactly one of the plurality of regions 302, and such that each of the plurality of regions 302 has at least two pixels allocated or assigned to it. As a non-limiting example, a total of $m_1$ unique pixels of the medical image 104 can be allocated or assigned to the region 302(1), for any suitable positive integer $m_1>1$. That is, the region 302(1) can comprise or otherwise include a pixel 302(1)(1) to a pixel 302(1)($m_1$). As another non-limiting example, a total of $m_n$ unique pixels of the medical image 104 can be allocated or assigned to the region 302(n), for any suitable positive integer $m_n>1$. That is, the region 302(n) can comprise or otherwise include a pixel 302(n)(1) to a pixel 302(n)($m_n$). Because each pixel of the medical image 104 can be allocated or assigned to exactly one of the plurality of regions 302, the plurality of regions 302 can be considered as being disjoint (e.g., non-overlapping) with each other. In other words, each of the plurality of regions 302 can be considered as being a unique subset of the pixels of the medical image 104, and the intersection of any two of such unique subsets can be null. In such case, the medical image 104 can be considered as having a total of $\Sigma_{r=1}^{n} m_r$ pixels. Furthermore, because each of the plurality of regions can have at least two pixels allocated or assigned to it, it can be the case that $1<n<\Sigma_{r=1}^{n} m_r$. In other words, it can be the case that there are fewer total regions of the medical image 104 than total pixels of the medical image 104.

Various non-limiting aspects of the plurality of regions 302 are described with respect to FIGS. 4-8.

FIGS. 4-8 illustrate example, non-limiting block diagrams 400, 500, 600, 700, and 800 of the plurality of regions 302 in accordance with one or more embodiments described herein.

Figure 4:
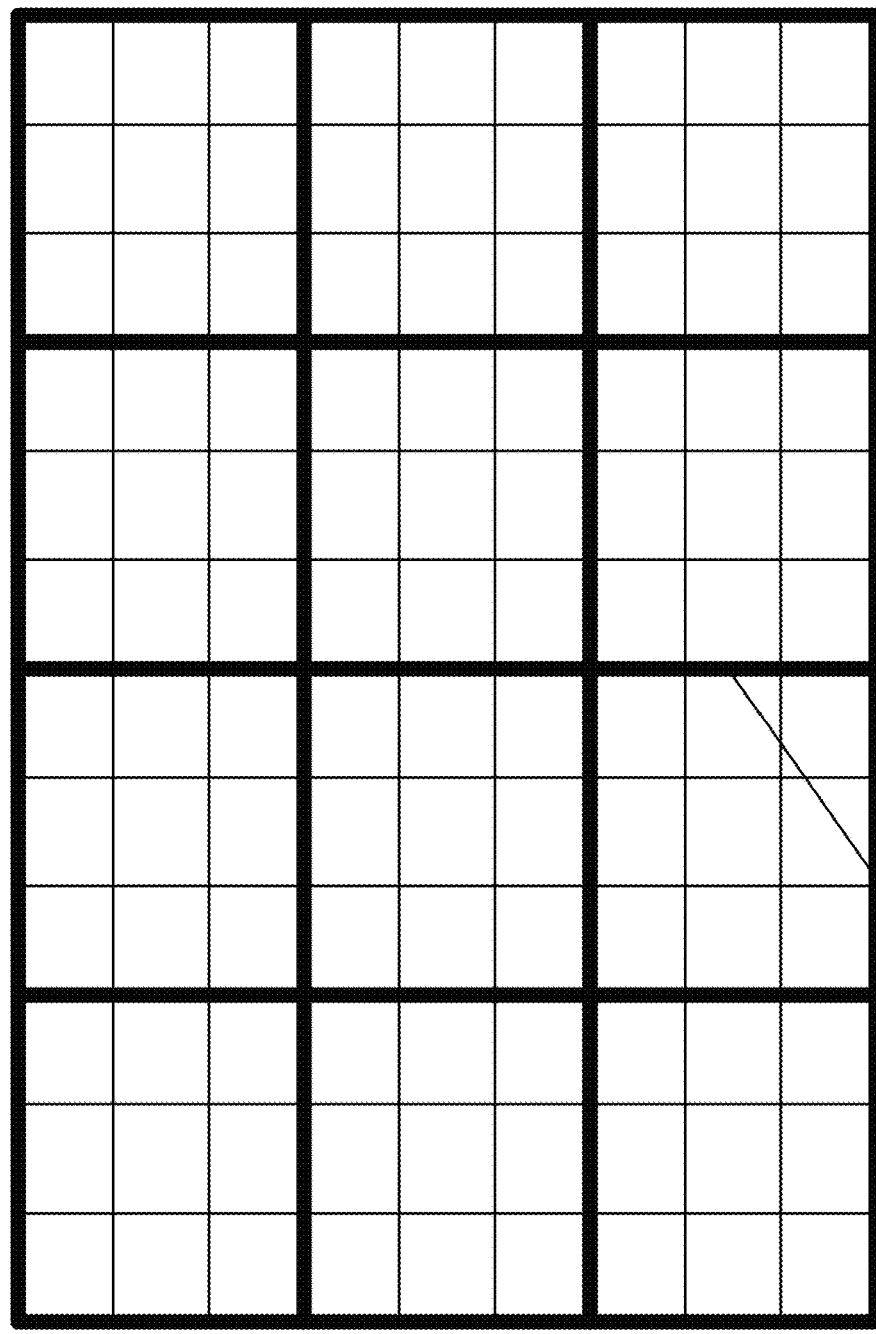
FIGS. 4-8 illustrate example, non-limiting block diagrams of image regions in accordance with one or more embodiments described herein.

First, consider FIG. 4. As shown, an example, non-limiting embodiment of the medical image 104 can comprise nine rows and twelve columns of pixels. That is, the medical image 104 can, in such case, comprise a total of 108 pixels. In various aspects, as shown, such 108 total pixels can be considered as being grouped into disjoint 3-by-3 blocks of pixels, thereby yielding a total of twelve 3-by-3 blocks. For example, the pixels that occupy rows one to three and columns one to three of the medical image 104 can be considered as collectively forming a first 3-by-3 block of pixels. As another example, the pixels that occupy rows one to three and columns four to six of the medical image 104 can be considered as collectively forming a second 3-by-3 block of pixels. As yet another example, the pixels that occupy rows seven to nine and columns ten to twelve of the medical image 104 can be considered as collectively forming a twelfth 3-by-3 block of pixels.

In various instances, each of such twelve 3-by-3 blocks can be considered as one of the plurality of regions 302. In such case, n=12, $m_r$=9 for all positive integers r with $1 \leq r \leq n$, and each of the plurality of regions 302 can be considered as having a contiguous square shape. However, this is a mere non-limiting example.

In some cases, two or more of such 3-by-3 blocks that are adjacent to or otherwise touching each other can be considered as belonging to the same region as each other, which can cause such region to have a contiguous non-square shape. For example, the first 3-by-3 block (e.g., defined as including pixels in rows one to three and in columns one to three) and a fifth 3-by-3 block (e.g., defined as including pixels in rows four to six and in columns one to three) can collectively be considered as one of the plurality of regions 302. In such case, the region that contains the first 3-by-3 block and the fifth 3-by-3 block can have a total of 18 pixels and can be considered as exhibiting a contiguous rectangular shape, as opposed to a contiguous square shape. As another example, the first 3-by-3 block (e.g., defined as including pixels in rows one to three and in columns one to three) and a sixth 3-by-3 block (e.g., defined as including pixels in rows four to six and in columns four to six) can collectively be considered as one of the plurality of regions 302. In such case, the region that contains the first 3-by-3 block and the sixth 3-by-3 block can have a total of 18 pixels and can be considered as exhibiting a contiguous bow-tie or hour-glass shape, as opposed to a contiguous square shape or a contiguous rectangular shape.

In some cases, two or more of such 3-by-3 blocks that are not adjacent to or otherwise touching each other can be considered as belonging to the same region as each other. For example, the first 3-by-3 block (e.g., defined as including pixels in rows one to three and in columns one to three) and a seventh 3-by-3 block (e.g., defined as including pixels in rows four to six and in columns seven to nine) can collectively be considered as one of the plurality of regions 302, notwithstanding that the first 3-by-3 block and the seventh 3-by-3 block are not touching each other. In such case, the region that contains the first 3-by-3 block and the seventh 3-by-3 block can have a total of 18 pixels and can be considered as being non-contiguous.

Figure 5:
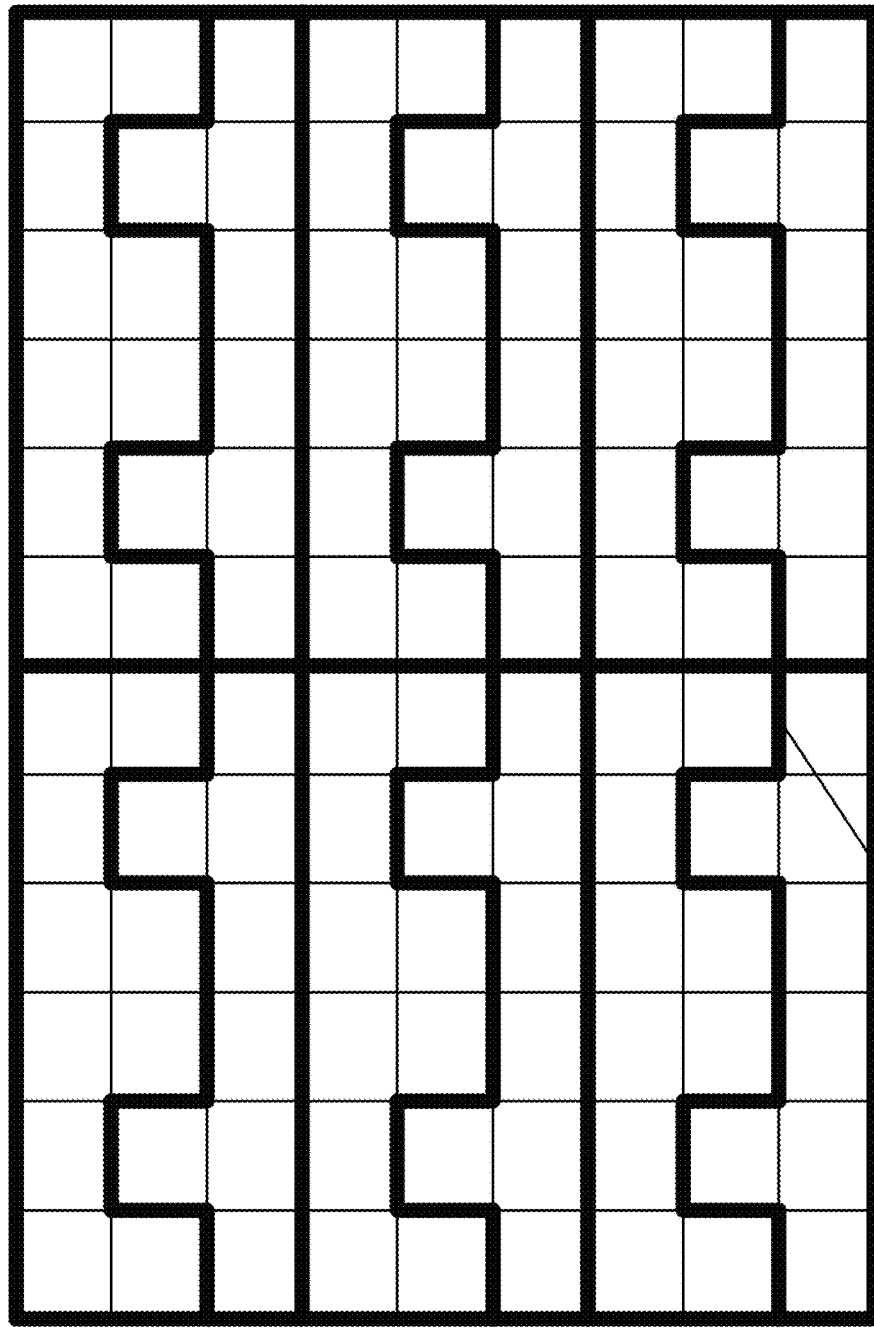

Now, consider FIG. 5. Again, the medical image 104 can, in a non-limiting example embodiment, comprise nine rows and twelve columns of pixels, for a total of 108 pixels. However, rather than being grouped into disjoint 3-by-3 blocks, the pixels of the medical image 104 can instead be grouped into irregular-but-repeating shapes as shown in FIG. 5. As shown, there can be a total of twelve of such irregular-but-repeating shapes, with six of such irregular-but-repeating shapes comprising ten pixels each, and with the remaining six of such irregular-but-repeating shapes comprising eight pixels each.

In various instances, each of such twelve irregular-but-repeating shapes can be considered as one of the plurality of regions 302. In such case, n=12, and each of the plurality of regions 302 can be considered as being contiguous. However, this is a mere non-limiting example. In other instances, two or more of such irregular-but-repeating shapes can be considered as belonging to the same region as each other, regardless of whether such two or more irregular-but-repeating shapes are touching each other (e.g., again, any of the plurality of regions 302 can be non-contiguous).

Figure 6:
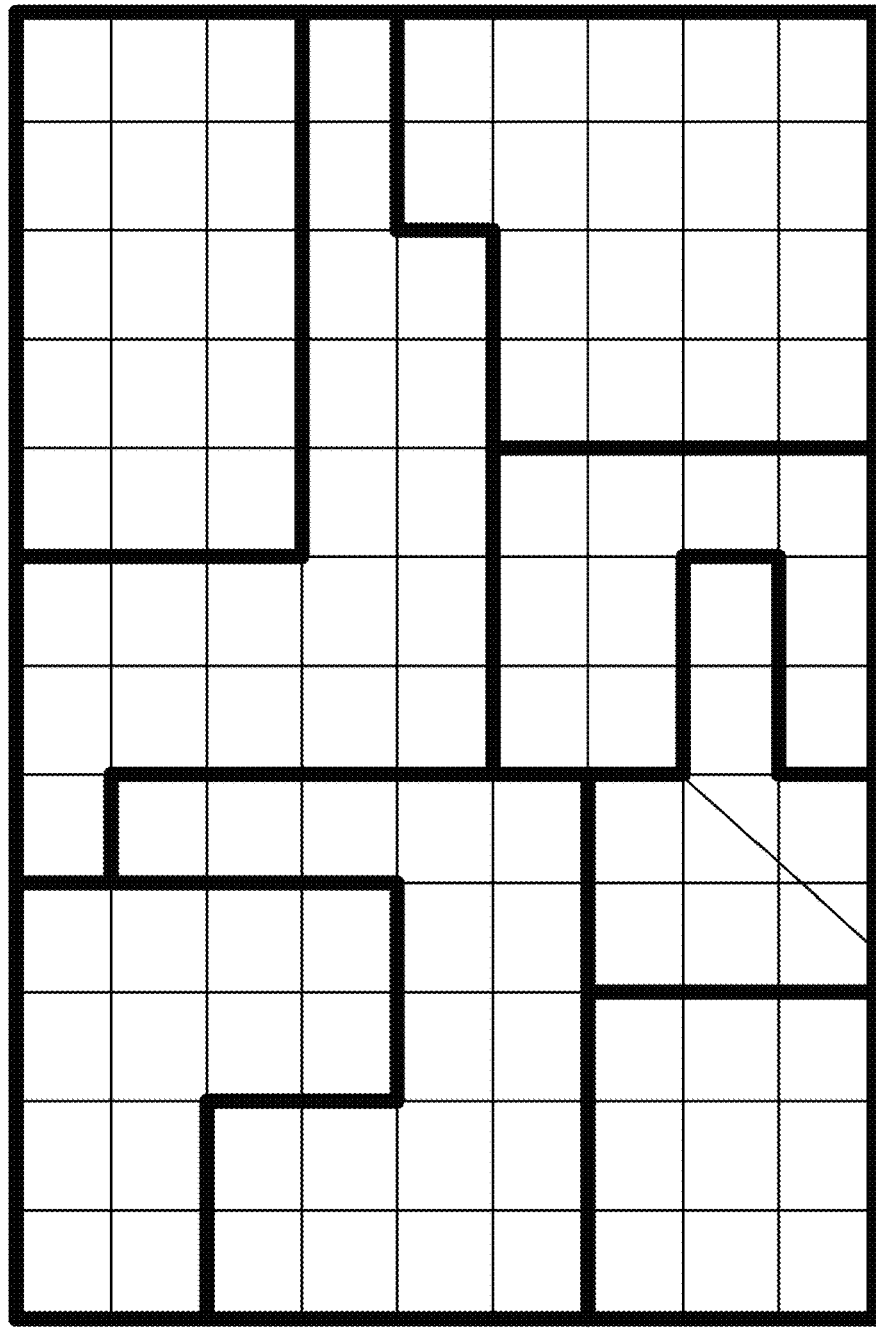

Now, consider FIG. 6. Again, the medical image 104 can, in a non-limiting example embodiment, comprise nine rows and twelve columns of pixels, for a total of 108 pixels. However, rather than being grouped into disjoint 3-by-3 blocks or into the irregular-but-repeating shapes shown in FIG. 5, the pixels of the medical image 104 can instead be grouped into irregular-and-nonrepeating shapes as shown in FIG. 6. As shown, there can be a total of eight of such irregular-and-nonrepeating shapes, with each of such irregular-and-nonrepeating shapes comprising a unique or distinct number of pixels.

In various aspects, each of such eight irregular-and-nonrepeating shapes can be considered as one of the plurality of regions 302. In such case, n=8, and each of the plurality of regions 302 can be considered as being contiguous. However, this is a mere non-limiting example. In other instances, two or more of such irregular-and-nonrepeating shapes can be considered as belonging to the same region as each other, regardless of whether such two or more irregular-and-nonrepeating shapes are touching each other (e.g., again, any of the plurality of regions 302 can be non-contiguous).

Generally, any of the plurality of regions 302 can have any suitable shape (e.g., regular, irregular, convex, non-convex) and any suitable contiguity (e.g., contiguous or non-contiguous). In some instances, different ones of the plurality of regions 302 can have the same or different shapes than each other (e.g., the shapes can be repeating or nonrepeating). Similarly, different ones of the plurality of regions 302 can have the same or different contiguities as each other (e.g., some regions can be contiguous, and other regions can be non-contiguous). In any case, there can be fewer regions in the plurality of regions 302 than there are pixels in the medical image 104.

In various aspects, the plurality of regions 302 can be based on or otherwise defined according to pixel intensity intervals. For instance, the full range of pixel intensity values exhibited by the medical image 104 can be broken up into n disjoint intervals or bins, and each of the plurality of regions 302 can contain all pixels of the medical image 104 that fall within a respective one of those intervals or bins. As a non-limiting example, the region 302(1) can contain all pixels of the medical image 104 that fall within a first distinct interval or bin of pixel intensity values, and the region 302(n) can contain all pixels of the medical image 104 that fall within an n-th distinct interval or bin of pixel intensity values. In various cases, any of such n distinct or disjoint intervals or bins can be contiguous. In various other cases, any of such n distinct or disjoint intervals or bins can be non-contiguous.

In various other instances, the plurality of regions 302 can instead be based on or otherwise defined according to whatever types of tissues (or other anatomical structures or portions thereof) are exhibited in the medical image 104. As some non-limiting examples, such types of tissues can include brain tissue, lung tissue, bone tissue, muscle tissue, thick tissue, thin tissue, or intermediate-thickness tissue. In some cases, each of the plurality of regions 302 can contain, comprise, or otherwise consist of all pixels of the medical image 104 that belong to a respective type of tissue. Various non-limiting aspects regarding such tissue-based regions are described with respect to FIGS. 7-8.

Figure 7:
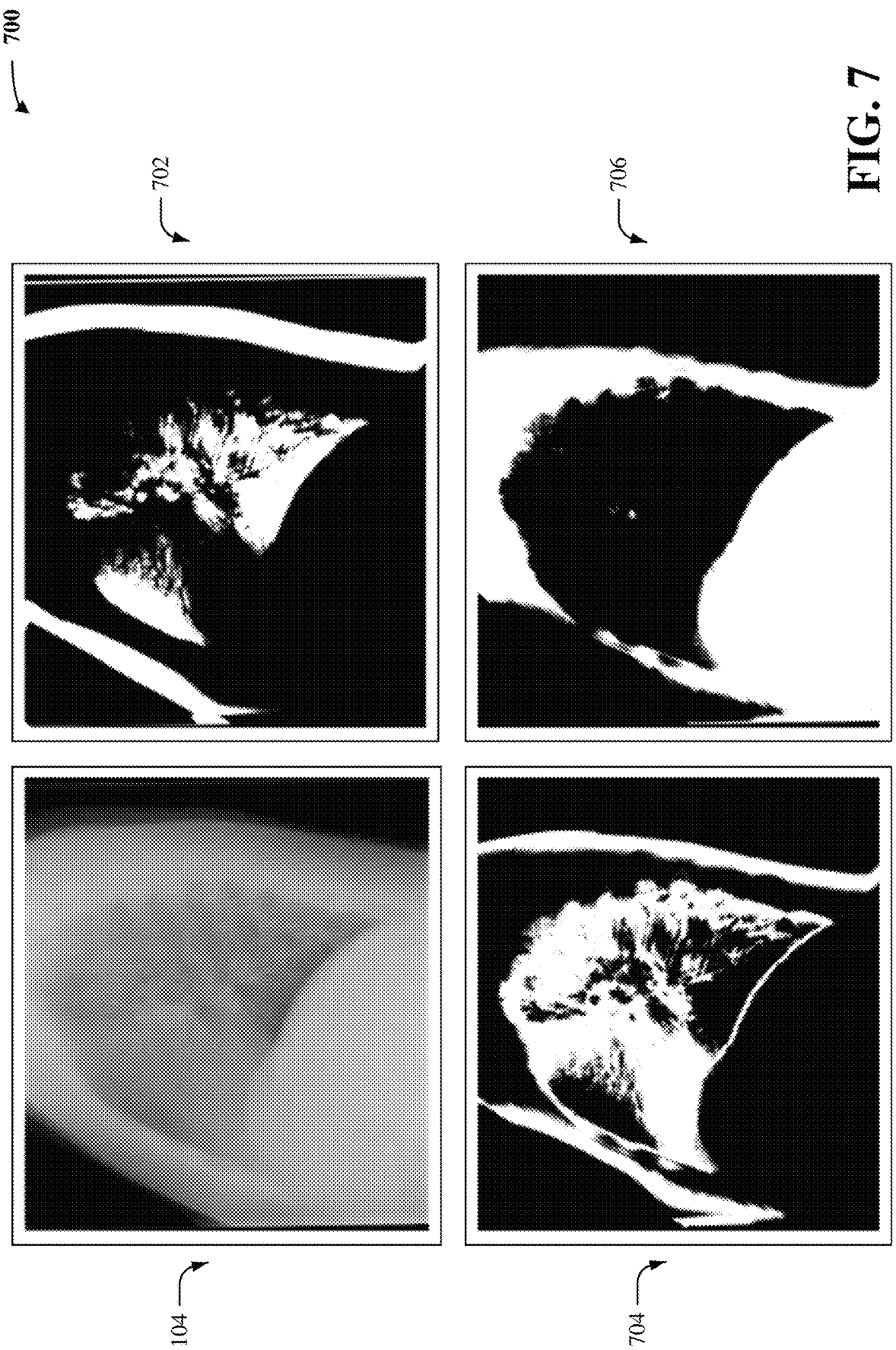

First, consider FIG. 7. As shown, the medical image 104 can, in a non-limiting example embodiment, be a CT scanned image of a torso of a medical patient. In various aspects, the medical image 104 can be fed as input to a pre-trained tissue segmentation model (not shown), and such pre-trained tissue segmentation model can produce as output one or more pixel-wise segmentation masks that indicate which pixels of the medical image 104 belong to or otherwise make up which types of tissue. As a non-limiting example, the pre-trained tissue segmentation model can produce as output a segmentation mask 702, a segmentation mask 704, and a segmentation mask 706. In this non-limiting example, the segmentation mask 702 can be considered as indicating which pixels of the medical image 104 belong to or otherwise make up a thin anatomical tissue shown in the medical image 104, the segmentation mask 704 can be considered as indicating which pixels of the medical image 104 belong to or otherwise make up an intermediate-thickness anatomical tissue shown in the medical image 104, and the segmentation mask 706 can be considered as indicating which pixels of the medical image 104 belong to or otherwise make up a thick anatomical tissue shown in the medical image 104. Accordingly, n=4 in such case, where a first region of the plurality of regions 302 can contain all pixels that belong to the thin anatomical tissue, where a second region of the plurality of regions 302 can contain all pixels that belong to the intermediate-thickness anatomical tissue, where a third region of the plurality of regions 302 can contain all pixels that belong to the thick anatomical tissue, and where a fourth region of the plurality of regions 302 can contain all pixels that belong to none of the thin, intermediate-thickness, or thick anatomical tissues.

Figure 8:
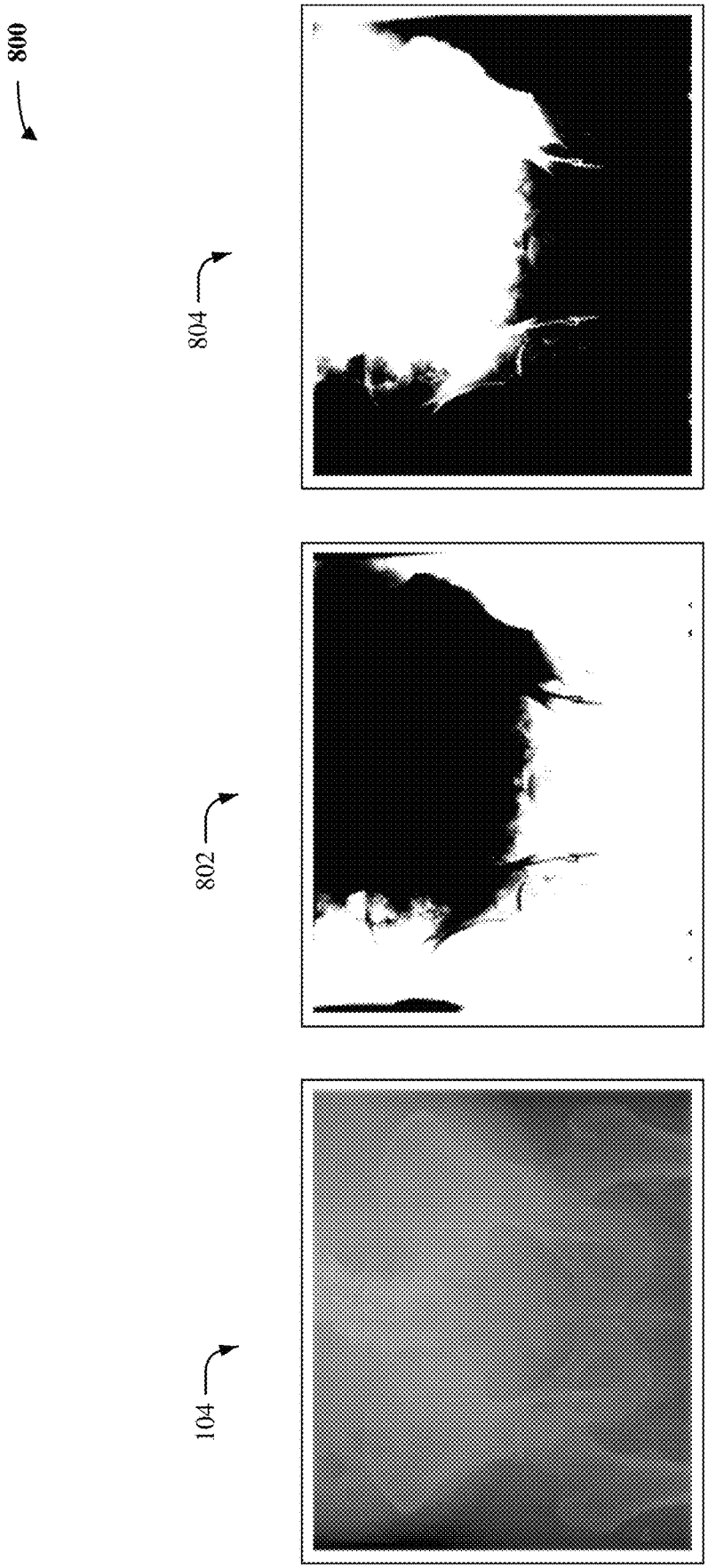

Now, consider FIG. 8. As shown, the medical image 104 can, in a non-limiting example embodiment, be a CT scanned image of a pelvis of a medical patient. In various aspects, the medical image 104 can be fed as input to a pre-trained tissue segmentation model (not shown), and such pre-trained tissue segmentation model can produce as output one or more pixel-wise segmentation masks that indicate which pixels of the medical image 104 belong to or otherwise make up which types of tissue. As a non-limiting example, the pre-trained tissue segmentation model can produce as output a segmentation mask 802 and a segmentation mask 804. In this non-limiting example, the segmentation mask 802 can be considered as indicating which pixels of the medical image 104 belong to or otherwise make up a thin anatomical tissue shown in the medical image 104, and the segmentation mask 804 can be considered as indicating which pixels of the medical image 104 belong to or otherwise make up a thick anatomical tissue shown in the medical image 104. Accordingly, n=3 in such case, where a first region of the plurality of regions 302 can contain all pixels that belong to the thin anatomical tissue, where a second region of the plurality of regions 302 can contain all pixels that belong to the thick anatomical tissue, and where a third region of the plurality of regions 302 can contain all pixels that belong to neither the thin nor the thick anatomical tissues.

In any case, the pixels of medical image 104 can be distributed among the plurality of regions 302.

Referring back to FIG. 3, the inference component 112 can electronically execute the deep learning neural network 202 on the medical image 104, thereby causing the deep learning neural network 202 to produce the set of region-wise parameter maps 204. More specifically, the inference component 112 can provide or otherwise pass the medical image 104 to an input layer of the deep learning neural network 202. In various instances, the medical image 104 can complete a forward pass through one or more hidden layers of the deep learning neural network 202. In various cases, an output layer of the deep learning neural network 202 can compute or otherwise calculate the set of region-wise parameter maps 204, based on activations generated by the one or more hidden layers of the deep learning neural network 202.

In various aspects, as shown, the set of region-wise parameter maps 204 can comprise p parameter maps for any suitable positive integer p: a region-wise parameter map 204(1) to a region-wise parameter map 204(P). In various instances, each of the set of region-wise parameter maps 204 can be any suitable electronic data that can indicate or otherwise represent one parameter per region of the medical image 104. Accordingly, because the plurality of regions 302 can have n regions, each of the set of region-wise parameter maps 204 can have, include, comprise, or consist of n parameters.

As a non-limiting example, the region-wise parameter map 204(1) can be a vector, matrix, or tensor that has a total of n parameters: a parameter 204(1)(1) to a parameter 204(1)(n). In various aspects, the parameter 204(1)(1) can be any suitable scalar coefficient that has any suitable magnitude and that corresponds to the region 302(1). Similarly, the parameter 204(1)(n) can be any suitable scalar coefficient that has any suitable magnitude and that corresponds to the region 302(n).

As another non-limiting example, the region-wise parameter map 204(1) can be a vector, matrix, or tensor that has a total of n parameters: a parameter 204(1)(1) to a parameter 204(1)(n). In various aspects, the parameter 204(1)(1) can be any suitable scalar coefficient that has any suitable magnitude and that corresponds to the region 302(1). Similarly, the parameter 204(1)(n) can be any suitable scalar coefficient that has any suitable magnitude and that corresponds to the region 302(n).

Accordingly, each of the set of region-wise parameter maps 204 can have a total of n parameters: one parameter per each of the plurality of regions 302. Because there can be fewer regions than pixels in the medical image 104, each of the set of region-wise parameter maps 204 can have fewer parameters (e.g., can have a smaller dimensionality) than an analogous pixel-wise parameter map would have. For example, consider again FIG. 4, where the medical image 104 can have a total of 108 pixels and a total of 12 regions (e.g., each region can be a disjoint 3-by-3 block of pixels). In such case, a pixel-wise parameter map would be a vector, matrix, or tensor having 108 parameters (e.g., 108 scalar coefficients): one parameter per pixel. In stark contrast, a region-wise parameter map would, in such case, be a vector, matrix, or tensor having only 12 parameters (e.g., 12 scalar coefficients): one parameter per region, not one parameter per pixel. As another example, consider again FIG. 6, where the medical image 104 can have a total of 108 pixels and a total of 8 regions (e.g., the regions can be irregular-and-nonrepeating). In such case, a pixel-wise parameter map would be a vector, matrix, or tensor having 108 parameters (e.g., 108 scalar coefficients): one parameter per pixel. In stark contrast, a region-wise parameter map would, in such case, be a vector, matrix, or tensor having only 8 parameters (e.g., 8 scalar coefficients): one parameter per region.

In any case, the inference component 112 can execute the deep learning neural network 202 on the medical image 104, thereby yielding the set of region-wise parameters maps 204.

Figure 9:
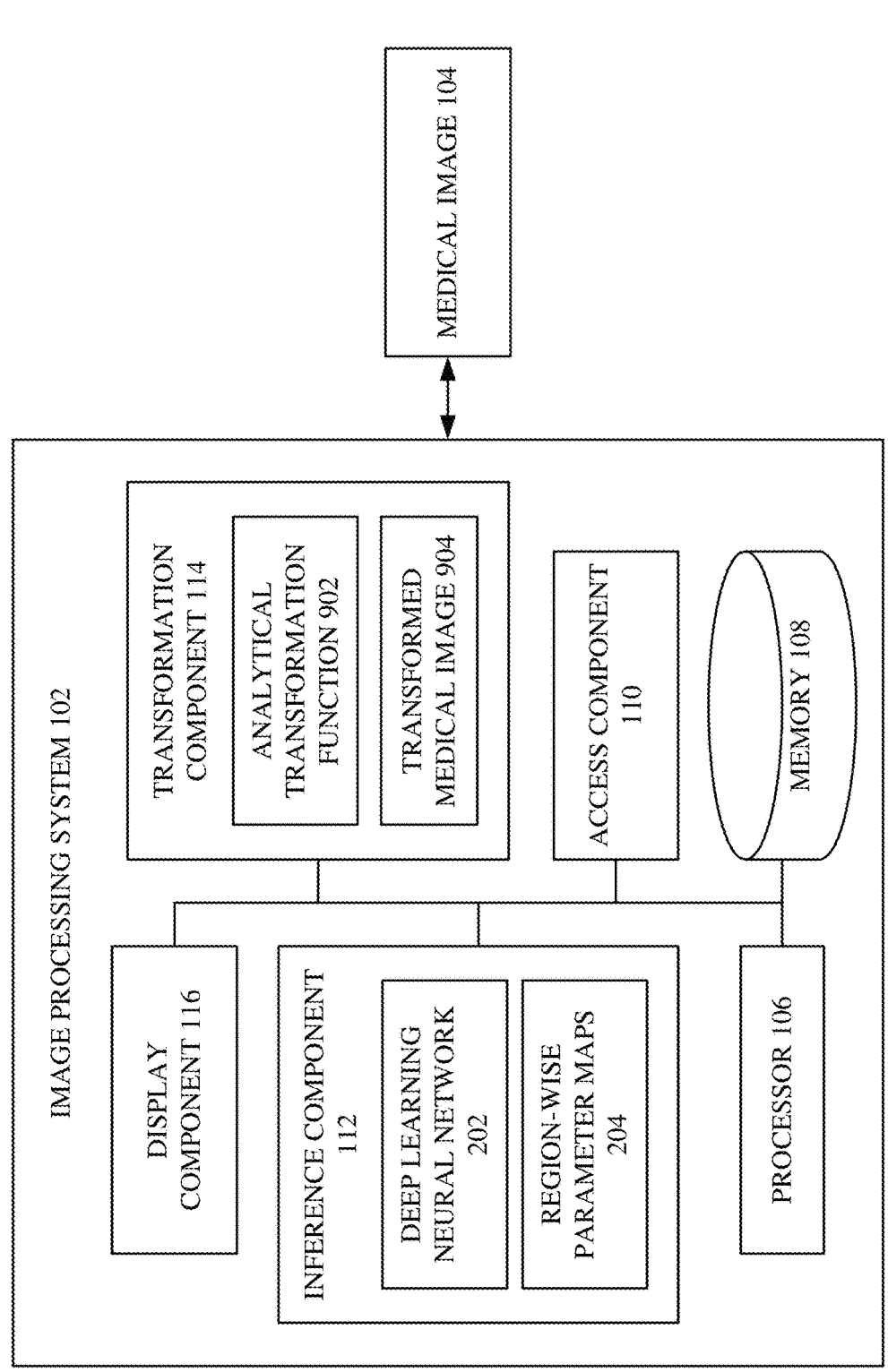
FIG. 9 illustrates a block diagram of an example, non-limiting system including an analytical transformation function and a transformed medical image that facilitates improved deep learning image processing in accordance with one or more embodiments described herein.

FIG. 9 illustrates a block diagram of an example, non-limiting system 900 including an analytical transformation function and a transformed medical image that can facilitate improved deep learning image processing in accordance with one or more embodiments described herein. As shown, the system 900 can, in some cases, comprise the same components as the system 200, and can further comprise an analytical transformation function 902 and a transformed medical image 904.

In various embodiments, the transformation component 114 can electronically generate the transformed medical image 904, based on the analytical transformation function 902 and the set of region-wise parameter maps 204. More specifically, the transformation component 114 can feed the medical image 104 and the set of region-wise parameter maps 204 to the analytical transformation function 902, and the result can be the transformed medical image 904. Various non-limiting aspects are described with respect to FIGS. 10-12.

Figure 10:
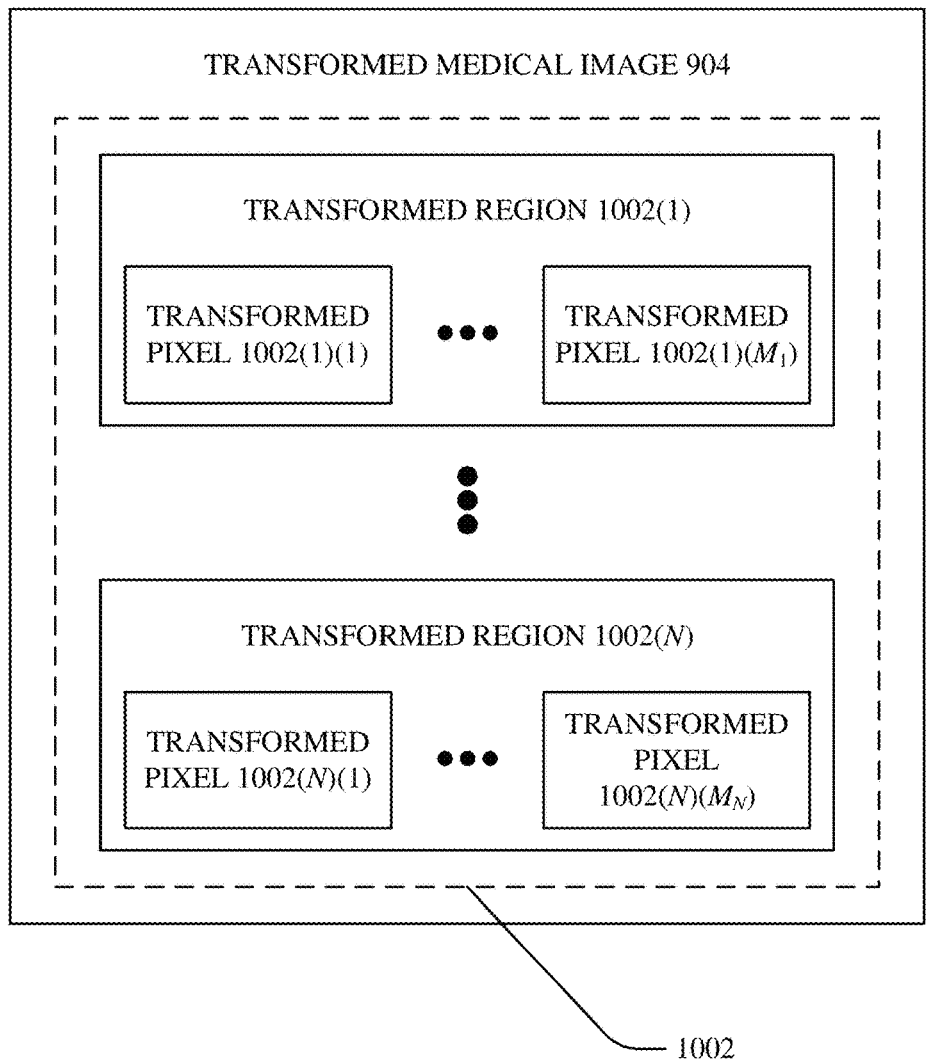
FIG. 10 illustrates an example, non-limiting block diagram of a transformed medical image in accordance with one or more embodiments described herein.

FIG. 10 illustrates an example, non-limiting block diagram 1000 of the transformed medical image 904 in accordance with one or more embodiments described herein. The transformed medical image 904 can have the same format, size, or dimensionality as the medical image 104. For example, if the medical image 104 is an x-by-y array of pixels, then the transformed medical image 904 can likewise be an x-by-y array of pixels (similarly, if the medical image 104 is an x-by-y-by-z array of voxels, then the transformed medical image 904 can likewise be an x-by-y-by-z array of voxels).

Indeed, in various aspects, the transformed medical image 904 can comprise a plurality of transformed regions 1002 that can respectively correspond (e.g., in one-to-one fashion) to the plurality of regions 302. Accordingly, since the plurality of regions 302 can comprise n regions, the plurality of transformed regions 1002 can likewise comprise n regions: a transformed region 1002(1) to a transformed region 1002($n$). In various instances, each of the plurality of transformed regions 1002 can be considered as having or including transformed versions of whatever pixels are allocated or assigned to a respective one of the plurality of regions 302.

As a non-limiting example, the transformed region 1002(1) can correspond to the region 302(1). Accordingly, because the region 302(1) can have a total of $m_1$ pixels, the transformed region 1002(1) can also have a total of $m_1$ pixels: a transformed pixel 1002(1)(1) to a transformed pixel 1002(1)($m_1$). In various cases, the transformed pixel 1002(1)(1) can be considered as a transformed version of the pixel 302(1)(1). In other words, the transformed pixel 1002(1)(1) can have the same intra-image location (e.g., the same row index and column index) as the pixel 302(1)(1), but the transformed pixel 1002(1)(1) can have a different intensity value than the pixel 302(1)(1). Similarly, the transformed pixel 1002(1)($m_1$) can be considered as a transformed version of the pixel 302(1)($m_1$). That is, the transformed pixel 1002(1)($m_1$) can have the same intra-image location (e.g., the same row index and column index) as the pixel 302(1)($m_1$), but the transformed pixel 1002(1)($m_1$) can have a different intensity value than the pixel 302(1)($m_1$).

As another non-limiting example, the transformed region 1002($n$) can correspond to the region 302($n$). Accordingly, because the region 302($n$) can have a total of my pixels, the transformed region 1002($n$) can also have a total of $m_n$ pixels: a transformed pixel 1002($n$)(1) to a transformed pixel 1002($n$)($m_n$). In various cases, the transformed pixel 1002($n$)(1) can be considered as a transformed version of the pixel 302($n$)(1). In other words, the transformed pixel 1002($n$)(1) can have the same intra-image location (e.g., the same row index and column index) as the pixel 302($n$)(1), but the transformed pixel 1002($n$)(1) can have a different intensity value than the pixel 302($n$)(1). Likewise, the transformed pixel 1002($n$)($m_n$) can be considered as a transformed version of the pixel 302($n$)($m_n$). That is, the transformed pixel 1002($n$)($m_n$) can have the same intra-image location (e.g., the same row index and column index) as the pixel 302($n$)($m_n$), but the transformed pixel 1002($n$)($m_n$) can have a different intensity value than the pixel 302($n$)($m_n$).

In various aspects, the transformation component 114 can obtain the transformed region 1002(1) by applying the analytical transformation function 902 to the region 302(1) and to whichever parameters in the set of region-wise parameter maps 204 correspond to the region 302(1). In similar fashion, the transformation component 114 can obtain the transformed region 1002($n$) by applying the analytical transformation function 902 to the region 302($n$) and to whichever parameters in the set of region-wise parameter maps 204 correspond to the region 302($n$). Various non-limiting aspects are described with respect to FIGS. 11-12.

Figure 11:
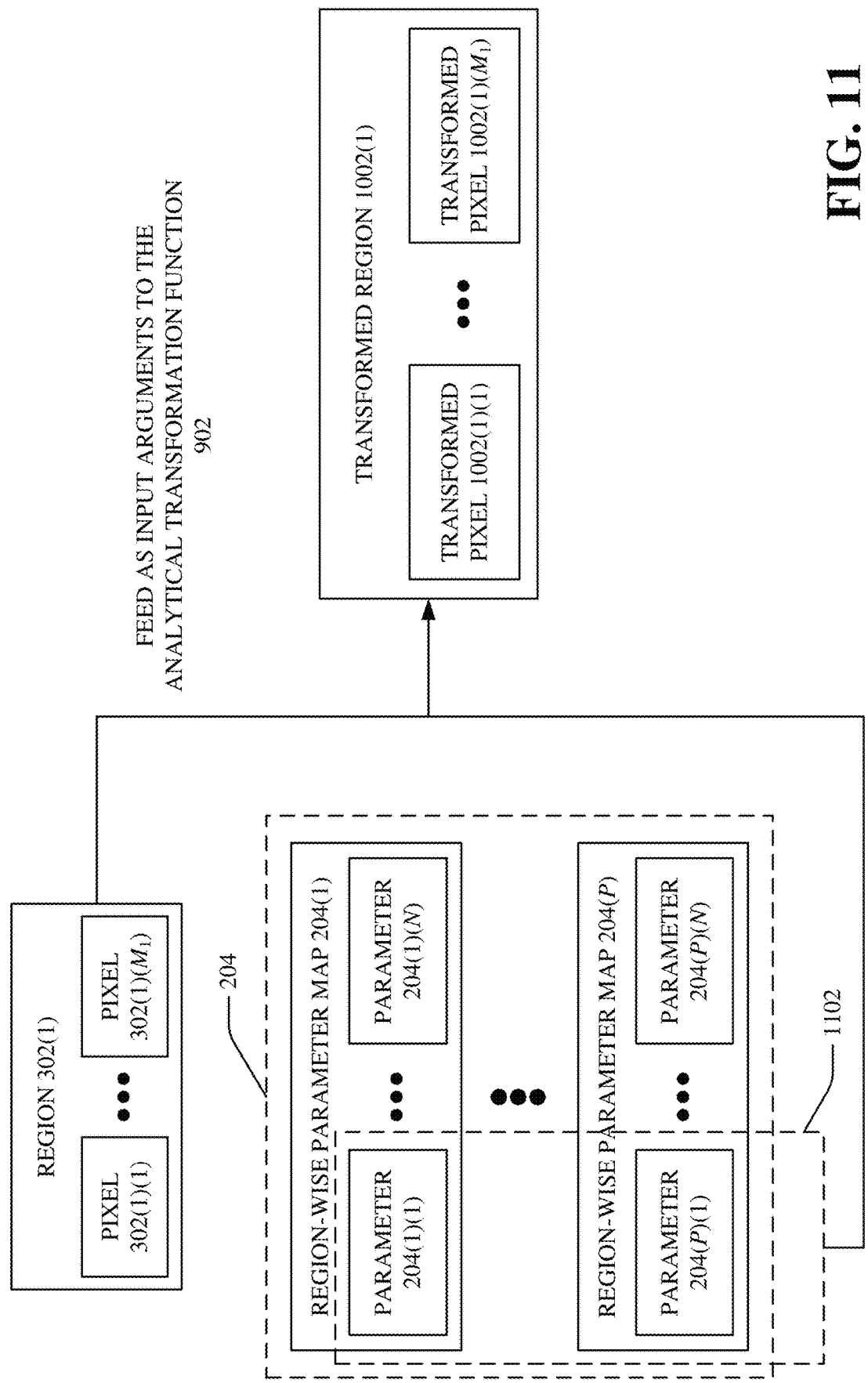
FIGS. 11-12 illustrate example, non-limiting block diagrams showing how a transformed medical image can be generated by an analytical transformation function in accordance with one or more embodiments described herein.
Figure 12:
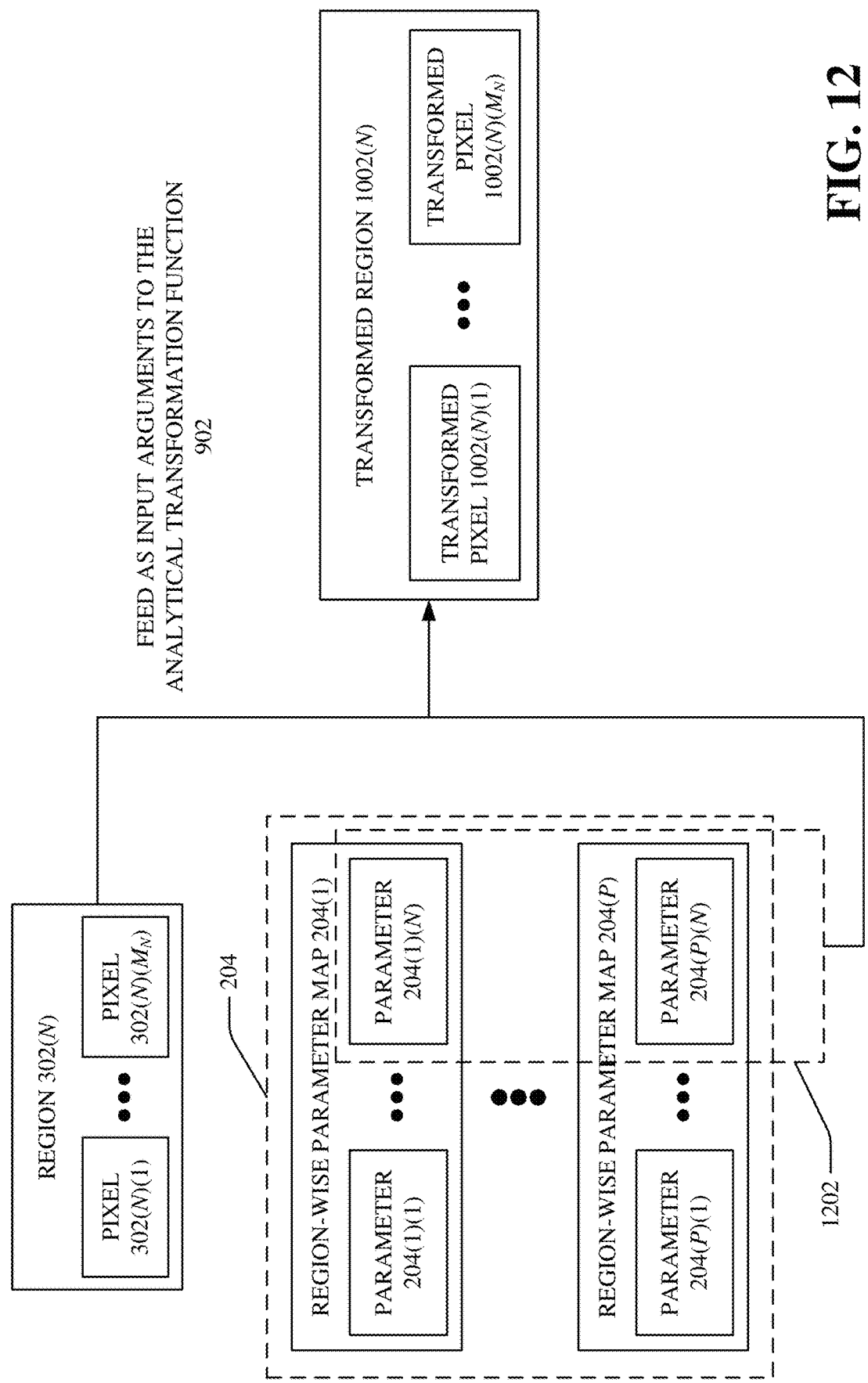

FIGS. 11-12 illustrate example, non-limiting block diagrams 1100 and 1200 showing how the transformed medical image 904 can be generated by the analytical transformation function 902 in accordance with one or more embodiments described herein.

First, consider FIG. 11. As mentioned above, the transformation component 114 can generate the transformed region 1002(1), by applying the analytical transformation function 902 to the region 302(1) and to whichever parameters of the set of region-wise parameter maps 204 correspond to the region 302(1).

More specifically, and as mentioned above, each of the set of region-wise parameter maps 204 can include, have, comprise, or consist of one parameter per region. Accordingly, each of the set of region-wise parameter maps 204 can have one parameter that corresponds to the region 302(1). For example, the parameter 204(1)(1) of the region-wise parameter map 204(1) can correspond to the region 302(1). As another example, the parameter 204($p$)(1) of the region-wise parameter map 204(p) can correspond to the region 302(1). Thus, there can be a total of p parameters specified in the set of region-wise parameter maps 204 that correspond to the region 302(1). For ease of explanation, such p parameters can be referred to as a set of parameters 1102.

In various aspects, the transformation component 114 can feed the region 302(1) and the set of parameters 1102 to the analytical transformation function 902, and the result can be the transformed region 1002(1). In particular, the analytical transformation function 902 can include any suitable number of any suitable types of mathematical operators that can be combined in any suitable fashions. As some non-limiting examples, the analytical transformation function 902 can include any suitable polynomial operators, any suitable logarithmic operators, any suitable exponential operators, or any suitable trigonometric operators that can be combined multiplicatively, additively, or exponentially with each other. In any case, the analytical transformation function 902 can be configured to take a total of p+1 scalar arguments and to produce one scalar as output. Accordingly, for each pixel allocated or assigned to the region 302(1), the transformation component 114 can feed that pixel and the set of parameters 1102 as arguments to the analytical transformation function 902, and the analytical transformation function 902 can produce as output a respective pixel in the transformed region 1002(1). For example, the transformation component 114 can feed the pixel 302(1)(1) and the set of parameters 1102 as arguments to the analytical transformation function 902, and the analytical transformation function 902 can produce as output the transformed pixel 1002(1)(1). That is, the value of the transformed pixel 1002(1)(1) can depend upon the value of the pixel 302(1)(1) and upon the set of parameters 1102. As another example, the transformation component 114 can feed the pixel 302(1)($m_1$) and the set of parameters 1102 as arguments to the analytical transformation function 902, and the analytical transformation function 902 can produce as output the transformed pixel 1002(1)($m_1$). In other words, the value of the transformed pixel 1002(1)($m_1$) can depend upon the value of the pixel 302(1)($m_1$) and upon the set of parameters 1102.

Now, consider FIG. 12. As mentioned above, the transformation component 114 can generate the transformed region 1002(n), by applying the analytical transformation function 902 to the region 302(n) and to whichever parameters of the set of region-wise parameter maps 204 correspond to the region 302(n).

More specifically, and as mentioned above, each of the set of region-wise parameter maps 204 can include, have, comprise, or consist of one parameter per region. Accordingly, each of the set of region-wise parameter maps 204 can have one parameter that corresponds to the region 302(n). For example, the parameter 204(1)(n) of the region-wise parameter map 204(1) can correspond to the region 302(n). As another example, the parameter 204(p)(n) of the region-wise parameter map 204(p) can correspond to the region 302(n). Thus, there can be a total of p parameters specified in the set of region-wise parameter maps 204 that correspond to the region 302(n). For case of explanation, such p parameters can be referred to as a set of parameters 1202.

In various aspects, the transformation component 114 can feed the region 302(n) and the set of parameters 1202 to the analytical transformation function 902, and the result can be the transformed region 1002(n). In particular, and as mentioned above, the analytical transformation function 902 can be configured to take a total of p+1 scalar arguments and to produce one scalar as output. Accordingly, for each pixel allocated or assigned to the region 302(n), the transformation component 114 can feed that pixel and the set of parameters 1202 as arguments to the analytical transformation function 902, and the analytical transformation function 902 can produce as output a respective pixel in the transformed region 1002(n). For example, the transformation component 114 can feed the pixel 302(n)(1) and the set of parameters 1202 as arguments to the analytical transformation function 902, and the analytical transformation function 902 can produce as output the transformed pixel 1002(n)(1). That is, the value of the transformed pixel 1002(n)(1) can depend upon the value of the pixel 302(n)(1) and upon the set of parameters 1202. As another example, the transformation component 114 can feed the pixel 302(n)($m_n$) and the set of parameters 1202 as arguments to the analytical transformation function 902, and the analytical transformation function 902 can produce as output the transformed pixel 1002(n)($m_n$). In other words, the value of the transformed pixel 1002(n)($m_n$) can depend upon the value of the pixel 302(n)($m_n$) and upon the set of parameters 1202.

As a non-limiting example for purposes of clarity, suppose that p=4. That is, suppose that the deep learning neural network 202 is configured to generate four region-wise parameter maps for the medical image 104, with each of such four region-wise parameter maps having one parameter per region. In such case, a non-limiting example of the analytical transformation function 902 can be as follows:

$$f(s, t, u, v, w) = \frac{1}{1 + \exp\left(-\frac{ts + u - v}{w}\right)}$$

where s can represent a pixel value (or voxel value) from the medical image 104, where t can represent whichever parameter of the first region-wise parameter map corresponds to the region to which s is assigned, where u can represent whichever parameter of the second region-wise parameter map corresponds to the region to which s is assigned, where v can represent whichever parameter of the third region-wise parameter map corresponds to the region to which s is assigned, where w can represent whichever parameter of the fourth region-wise parameter map corresponds to the region to which s is assigned, and where f (s, t, u, v, w) can represent the new or transformed value for the pixel s.

In any case, the transformation component 114 can generate the transformed medical image 904, by feeding the medical image 104 and the set of region-wise parameter maps 204 to the analytical transformation function 902. Accordingly, the transformed medical image 904 can be considered as a transformed version (e.g., tissue-equalized version, brightness-contrast-enhanced version, denoised version, modality-modified version) of the medical image 104.

In various embodiments, the display component 116 can electronically render, on any suitable electronic display (e.g., any suitable computer screen, any suitable computer monitor, any suitable graphical user-interface), the transformed medical image 904 or any of the set of region-wise parameter maps 204. Accordingly, a medical professional or technician that is attending to the medical patient whose anatomical structure is depicted in the medical image 104 can visually inspect the transformed medical image 904 or the set of region-wise parameter maps 204 (e.g., for diagnosis or prognosis purposes). In various other aspects, the display component 116 can electronically transmit the transformed medical image 904 or any of the set of region-wise parameter maps 204 to any suitable computing device (not shown).

To help ensure that the set of region-wise parameter maps 204, and thus the transformed medical image 904, are accurate, the deep learning neural network 202 can first undergo training. Various non-limiting aspects of such training are described with respect to FIGS. 13-15.

Figure 13:
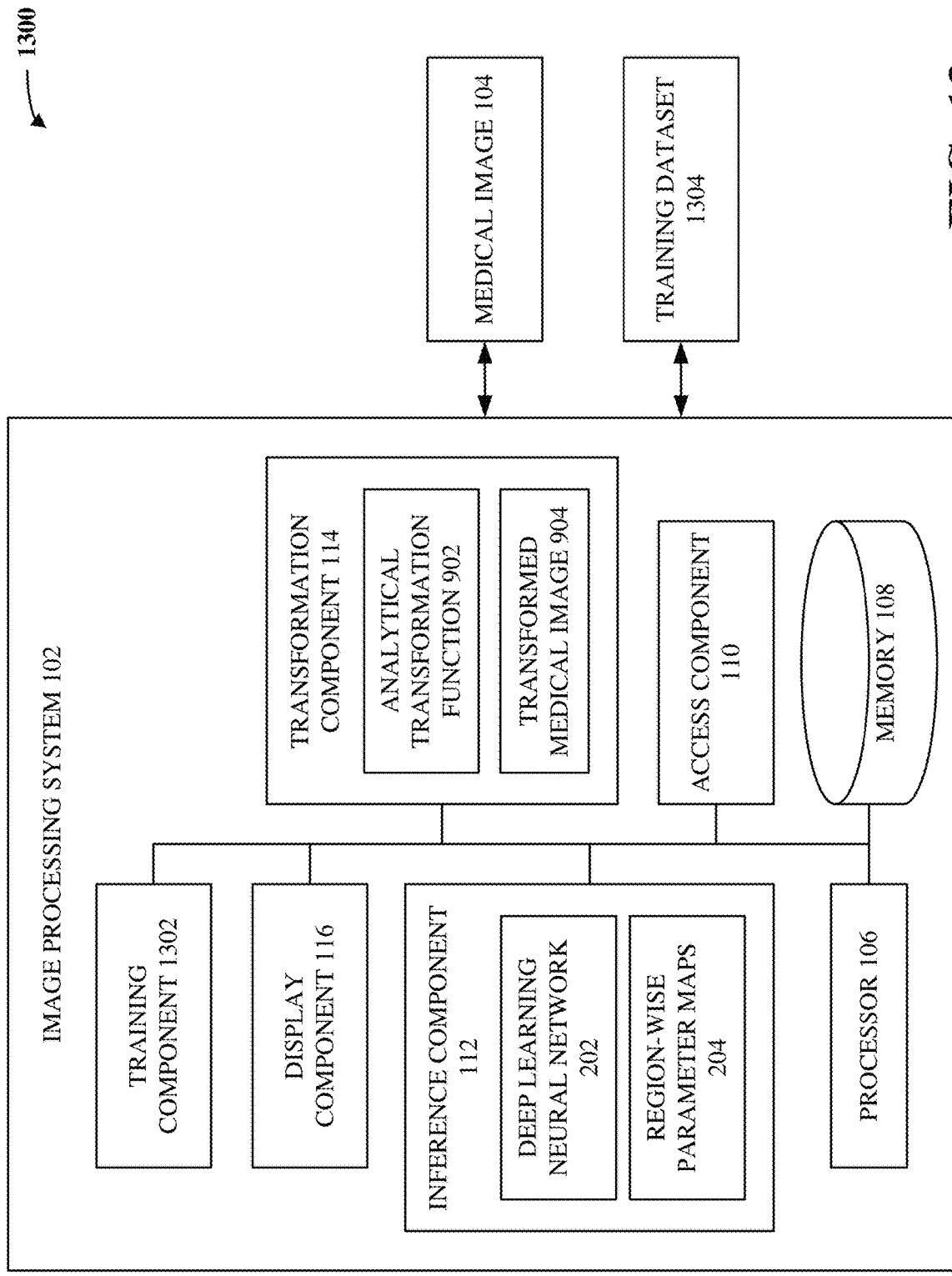
FIG. 13 illustrates a block diagram of an example, non-limiting system including a training component and a training dataset that facilitates improved deep learning image processing in accordance with one or more embodiments described herein.

FIG. 13 illustrates a block diagram of an example, non-limiting system 1300 including a training component and a training dataset that can facilitate improved deep learning image processing in accordance with one or more embodiments described herein. As shown, the system 1300 can, in some cases, comprise the same components as the system 900, and can further comprise a training component 1302 and a training dataset 1304.

In various embodiments, the access component 110 can electronically receive, retrieve, obtain, or otherwise access, from any suitable source, the training dataset 1304. In various aspects, the training component 1302 can train the deep learning neural network 202 on the training dataset 1304. In some cases, the training dataset 1304 can be annotated, and so the training component 1302 can perform supervised training on the deep learning neural network 202, as described with respect to FIGS. 14-15.

Figure 14:
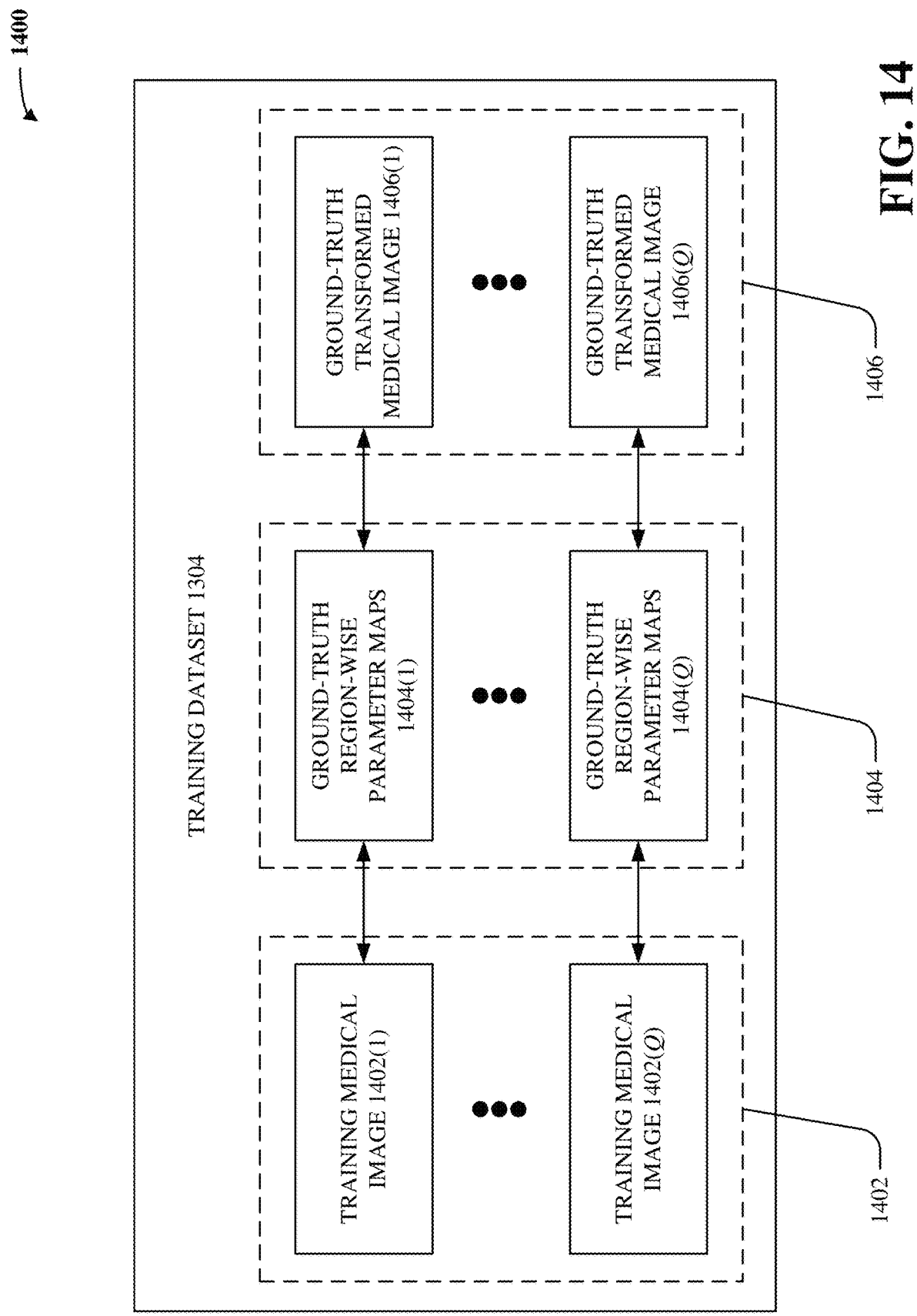
FIG. 14 illustrates an example, non-limiting block diagram of a training dataset in accordance with one or more embodiments described herein.

First, consider FIG. 14. FIG. 14 illustrates an example, non-limiting block diagram 1400 of the training dataset 1304 in accordance with one or more embodiments described herein.

As shown, the training dataset 1304 can, in various aspects, comprise a plurality of training medical images 1402. In various instances, the plurality of training medical images 1402 can comprise q images for any suitable positive integer q>1: a training medical image 1402(1) to a training medical image 1402($q$). In various cases, a training medical image can have the same format, size, or dimensionality as the medical image 104. For example, if the medical image 104 is an x-by-y pixel array that depicts an anatomical structure of a medical image, then each of the plurality of training medical images 1402 can likewise be an x-by-y pixel array that depicts a respective anatomical structure of a respective medical patient. As another example, if the medical image 104 is an x-by-y-by-z voxel array that depicts an anatomical structure of a medical image, then each of the plurality of training medical images 1402 can likewise be an x-by-y-by-z voxel array that depicts a respective anatomical structure of a respective medical patient.

In various aspects, each of the plurality of training medical images 1402 can have or otherwise be made up of the same number of regions as the medical image 104. Accordingly, since the medical image 104 can have or otherwise be made up of n regions, each of the plurality of training medical images 1402 can likewise have or otherwise be made up of n regions. For example, the pixels (or voxels) of the training medical image 1402(1) can be allocated, assigned, or otherwise distributed among n regions. As another example, the pixels (or voxels) of the training medical image 1402($q$) can be allocated, assigned, or otherwise distributed among n regions.

In some instances, the n regions of any given one of the plurality of training medical images 1402 can have pixels (or voxels) that are positioned identically to those pixels (or voxels) of the n regions of the medical image 104. As a non-limiting example, a first region of the training medical image 1402(1) can have a total of $m_1$ pixels of the training medical image 1402(1) assigned to it, where a first of such $m_1$ total pixels can have a same intra-image location (e.g., a same row index and column index) as the pixel 302(1)(1), and where an $m_1$-th pixel of such $m_1$ total pixels can have a same intra-image location (e.g., a same row index and column index) as the pixel 302(1)($m_1$). Similarly, an n-th region of the training medical image 1402(1) can have a total of $m_n$ pixels of the training medical image 1402(1) assigned to it, where a first of such $m_n$ total pixels can have a same intra-image location (e.g., a same row index and column index) as the pixel 302($n$)(1), and where an $m_n$-th pixel of such $m_n$ total pixels can have a same intra-image location (e.g., a same row index and column index) as the pixel 302($n$)($m_n$).

In various other instances, however, the n regions of any given one of the plurality of training medical images 1402 can have pixels (or voxels) that are not positioned identically to those pixels (or voxels) of the n regions of the medical image 104. Indeed, in such case, the n regions of that given one of the plurality of training medical images 1402 can have different cardinalities than the n regions of the medical image 104. This can occur if the n regions are defined according to intensity bins or tissue types. As a non-limiting example, a first region of the training medical image 1402(1) can have more than or less than $m_1$ total pixels assigned to it, and an n-th region of the training medical image 1402(1) can have more than or less than $m_n$ total pixels assigned to it. After all, if the first region includes all pixels that are within a specific intensity bin or that belong to a specific tissue type, it can be possible for $m_1$ total pixels of the medical image 104 to fall within that specific intensity bin or to belong to that specific tissue type, and for some different number of pixels of the training medical image 1402(1) to fall within that same specific intensity bin or to belong to that same specific tissue type. As another instance, if the n-th region includes all pixels that are within some other intensity bin or that belong to some other tissue type, it can be possible for $m_n$ total pixels of the medical image 104 to fall within that other intensity bin or to belong to that other tissue type, and for some different number of pixels of the training medical image 1402(1) to fall within that other intensity bin or to belong to that other tissue type.

As shown, the training dataset 1304 can, in various aspects, comprise a plurality of sets of ground-truth region-wise parameter maps 1404. In various instances, the plurality of sets of ground-truth region-wise parameter maps 1404 can respectively correspond (e.g., in one-to-one fashion) to the plurality of training medical images 1402. Thus, since the plurality of training medical images 1402 can have q images, the plurality of sets of ground-truth region-wise parameter maps 1404 can have q sets: a set of ground-truth region-wise parameter maps 1404(1) to a set of ground-truth region-wise parameter maps 1404($q$). In various aspects, each of the plurality of sets of ground-truth region-wise parameter maps 1404 can have the same format, size, or dimensionality as the set of region-wise parameter maps 204. In other words, each of the plurality of sets of ground-truth region-wise parameter maps 1404 can be considered as indicating or representing the correct or accurate region-wise parameter maps that are known or otherwise deemed to correspond to a respective one of the plurality of training medical images 1402. As a non-limiting example, the set of ground-truth region-wise parameter maps 1404(1) can correspond to the training medical image 1402(1). Accordingly, the set of ground-truth region-wise parameter maps 1404(1) can be considered as indicating or representing the p correct or accurate region-wise parameter maps (each comprising or consisting of n parameters, one per region) that are known or otherwise deemed to correspond to the training medical image 1402(1). As another non-limiting example, the set of ground-truth region-wise parameter maps 1404($q$) can correspond to the training medical image 1402($q$). So, the set of ground-truth region-wise parameter maps 1404($q$) can be considered as indicating or representing the p correct or accurate region-wise parameter maps (each comprising or consisting of n parameters, one per region) that are known or otherwise deemed to correspond to the training medical image 1402($q$).

As shown, the training dataset 1304 can, in various aspects, comprise a plurality of ground-truth transformed medical images 1406. In various instances, the plurality of ground-truth transformed medical images 1406 can respectively correspond (e.g., in one-to-one fashion) to the plurality of training medical images 1402. Thus, since the plurality of training medical images 1402 can have q images, the plurality of ground-truth transformed medical images 1406 can have q images: a ground-truth transformed medical image 1406(1) to a ground-truth transformed medical image 1406($q$). In various aspects, each of the plurality of ground-truth transformed medical images 1406 can have the same format, size, or dimensionality as the transformed medical image 904. In other words, each of the plurality of ground-truth transformed medical images 1406 can be considered as indicating or representing a transformed version of a respective one of the plurality of training medical images 1402 that is known or otherwise deemed to be correct or accurate. As a non-limiting example, the ground-truth transformed medical image 1406(1) can correspond to the training medical image 1402(1). Accordingly, the ground-truth transformed medical image 1406(1) can be considered as the known correct or accurate transformed version (e.g., tissue-equalized version, brightness-contrast-enhanced version, denoised version, modality-modified version) of the training medical image 1402(1). As another non-limiting example, the ground-truth transformed medical image 1406($q$) can correspond to the training medical image 1402($q$). So, the ground-truth transformed medical image 1406($q$) can be considered as the known correct or accurate transformed version (e.g., tissue-equalized version, brightness-contrast-enhanced version, denoised version, modality-modified version) of the training medical image 1402($q$).

Figure 15:
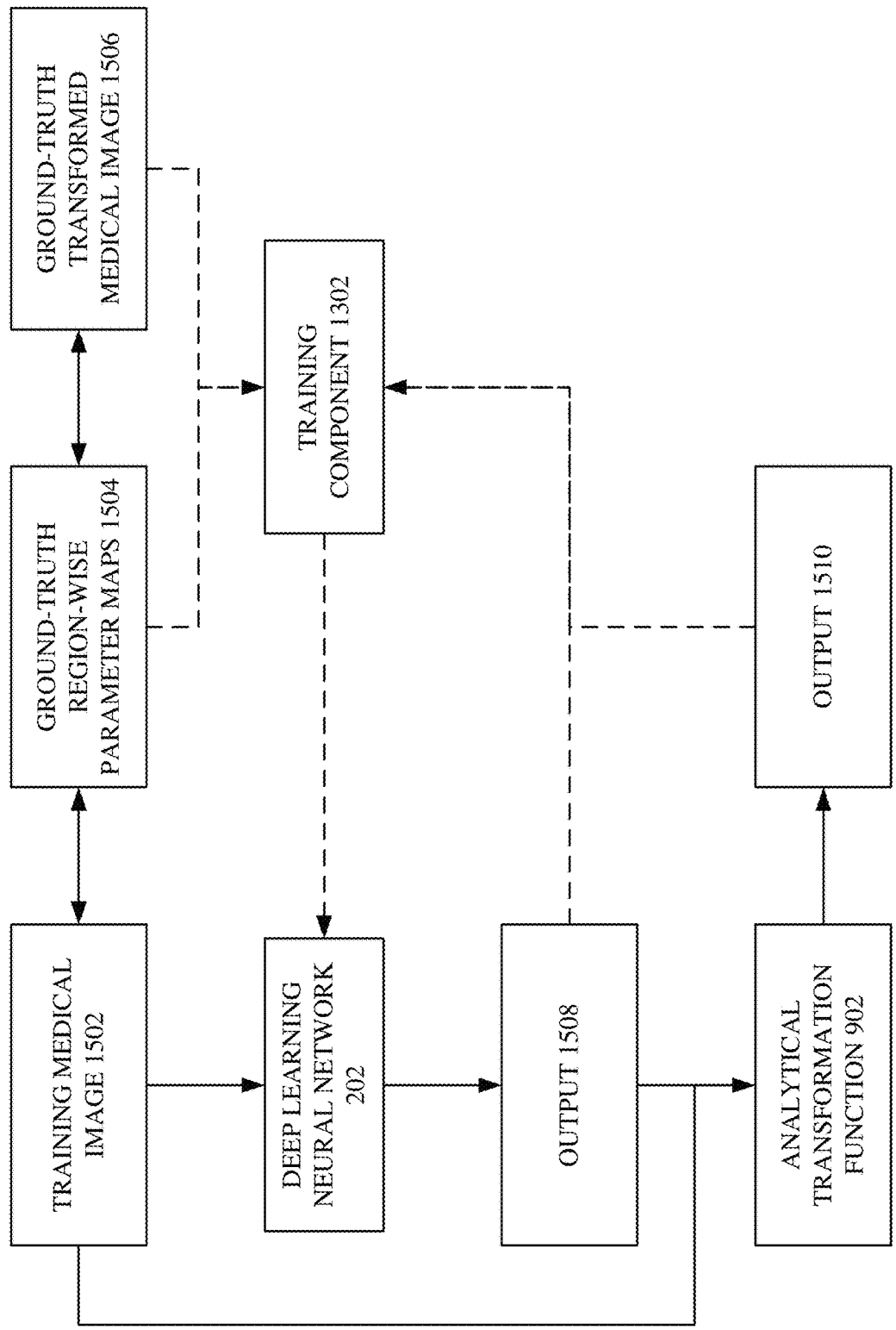
FIG. 15 illustrates an example, non-limiting block diagram showing how a deep learning neural network can be trained on a training dataset in accordance with one or more embodiments described herein.

Now, consider FIG. 15. FIG. 15 illustrates an example, non-limiting block diagram 1500 showing how the deep learning neural network 202 can be trained on the training dataset 1304 in accordance with one or more embodiments described herein.

In various aspects, the training component 1302 can, prior to beginning such training, initialize in any suitable fashion (e.g., random initialization) the trainable internal parameters (e.g., convolutional kernels, weight matrices, bias values) of the deep learning neural network 202.

In various instances, the training component 1302 can select from the training dataset 1304 a training medical image 1502, a set of ground-truth region-wise parameter maps 1504 that corresponds to the training medical image 1502, and a ground-truth transformed medical image 1506 that corresponds to the training medical image 1502. In various cases, as shown, the training component 1302 can execute the deep learning neural network 202 on the training medical image 1502, thereby causing the deep learning neural network 202 to produce an output 1508. More specifically, the training component 1302 can feed the training medical image 1502 to an input layer of the deep learning neural network 202, the training medical image 1502 can complete a forward pass through one or more hidden layers of the deep learning neural network 202, and an output layer of the deep learning neural network 202 can compute the output 1508 based on activations generated by the one or more hidden layers of the deep learning neural network 202.

Note that, in various cases, the size, format, or dimensionality of the output 1508 can be controlled or otherwise determined by the number of arrangement of neurons (or by characteristics of other internal parameters such as convolutional kernels) that are in the output layer of the deep learning neural network 202. That is, the output 1508 can be forced to have a desired size, format, or dimensionality, by controllably adding, removing, or adjusting neurons (or other internal parameters such as convolutional kernels) to, from, or in the output layer of the deep learning neural network 202.

In various aspects, the output 1508 can be considered as the p predicted or inferred region-wise parameter maps that the deep learning neural network 202 believes should correspond to the training medical image 1502. In contrast, the set of ground-truth region-wise parameter maps 1504 can be considered as the p correct or accurate region-wise parameter maps that are known or deemed to correspond to the training medical image 1502. Note that, if the deep learning neural network 202 has so far undergone no or little training, then the output 1508 can be highly inaccurate (e.g., can be quite different from the set of ground-truth region-wise parameter maps 1504).

In various instances, the training component 1302 can feed the output 1508 and the training medical image 1502 to the analytical transformation function 902, thereby yielding an output 1510. Accordingly, the output 1510 can be considered as the predicted or inferred transformed version (e.g., predicted or inferred tissue-equalized version, predicted or inferred brightness-contrast-enhanced version, predicted or inferred denoised version, predicted or inferred modality-modified version) of the training medical image 1502. In contrast, the ground-truth transformed medical image 1506 can be considered as the known correct or accurate transformed version (e.g., correct or accurate tissue-equalized version, correct or accurate brightness-contrast-enhanced version, correct or accurate denoised version, correct or accurate modality-modified version) of the training medical image 1502. As above, note that, if the deep learning neural network 202 has so far undergone no or little training, then the output 1510 can be highly inaccurate (e.g., can be quite different from the ground-truth transformed medical image 1506).

In various aspects, the training component 1302 can compute any suitable errors or losses (e.g., MAE, MSE, cross-entropy) between the output 1508 and the set of ground-truth region-wise parameter maps 1504. Likewise, in various instances, the training component 1302 can compute any suitable errors or losses (e.g., MAE, MSE, cross-entropy) between the output 1510 and the ground-truth transformed medical image 1506. In various cases, the training component 1302 can incrementally update, via backpropagation, the trainable internal parameters (e.g., convolutional kernels, weights, biases) of the deep learning neural network 202, based on such computed errors or losses.

In various aspects, the training component 1302 can repeat such execution and update procedure for each training medical image in the training dataset 1304. This can ultimately cause the trainable internal parameters (e.g., convolutional kernels, weights, biases) of the deep learning neural network 202 to become iteratively optimized to accurately generate region-wise parameter maps for inputted medical images. In various instances, the training component 1302 can implement any suitable training batch sizes, any suitable training termination criteria, or any suitable error, loss, or objective functions.

In some cases, it may be possible for the training dataset 1304 to lack the plurality of sets of ground-truth region-wise parameter maps 1404. In such case, the deep learning neural network 202 can be trained substantially as described with respect to FIG. 15, except that the set of ground-truth region-wise parameter maps 1504 can be unavailable. In such case, the training component 1302 can refrain from computing an error or loss between the output 1508 and the set of ground-truth region-wise parameter maps 1504. However, the training component 1302 can nevertheless computer an error or loss between the output 1510 and the ground-truth transformed medical image 1506, and backpropagation can be driven by such error or loss.

In other cases, it may be possible for the training dataset 1304 to lack the plurality of ground-truth transformed medical images 1406. In such case, the deep learning neural network 202 can be trained substantially as described with respect to FIG. 15, except that the ground-truth transformed medical image 1506 can be unavailable. In such case, the training component 1302 can refrain from computing an error or loss between the output 1510 and the ground-truth transformed medical image 1506. However, the training component 1302 can nevertheless computer an error or loss between the output 1508 and the set of ground-truth region-wise parameter maps 1504, and backpropagation can be driven by such error or loss. Note that, in such case, it can be unnecessary for the training component 1302 to apply the analytical transformation function 902 to the output 1508.

Figure 16:
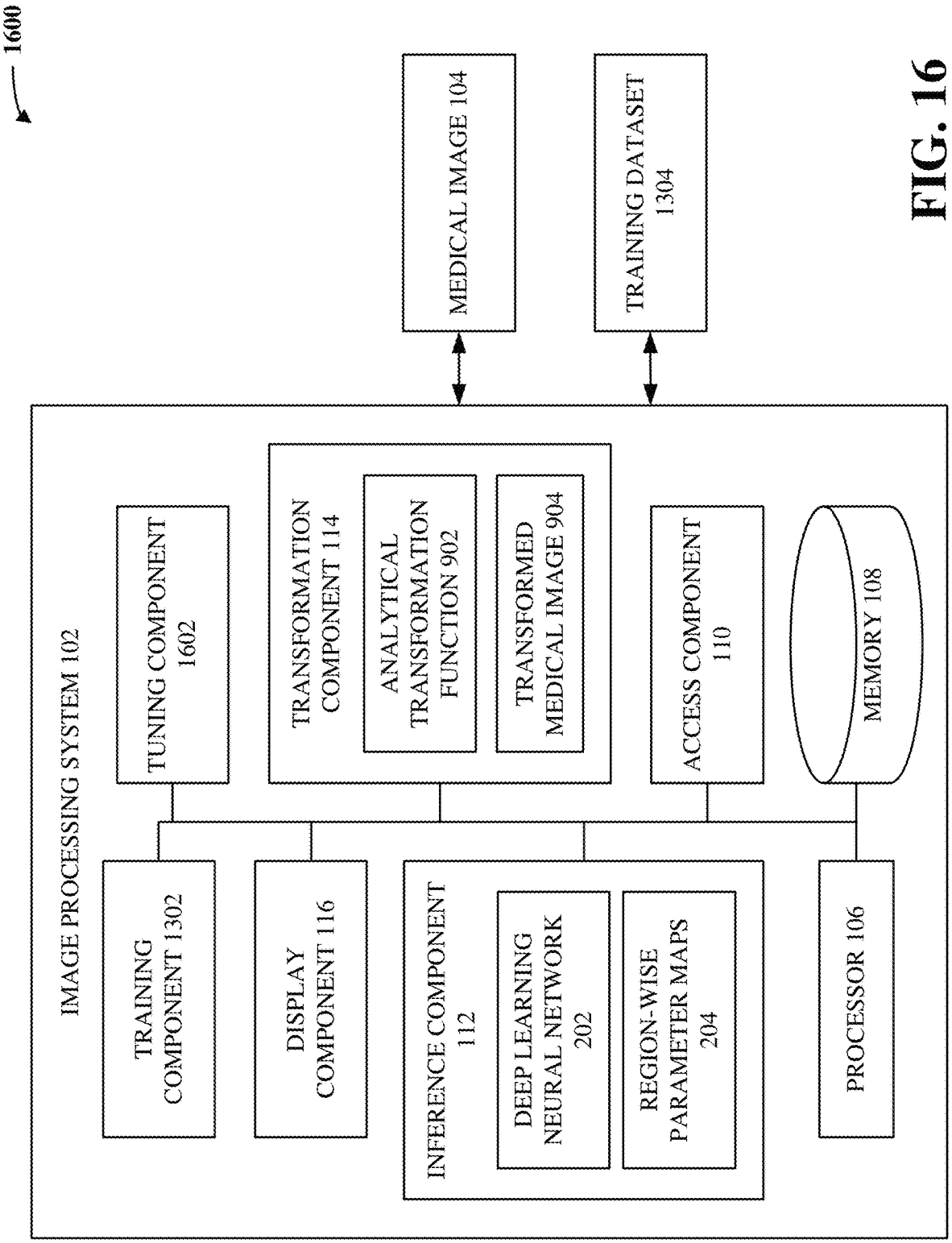
FIG. 16 illustrates a block diagram of an example, non-limiting system including a tuning component that facilitates improved deep learning image processing in accordance with one or more embodiments described herein.

FIG. 16 illustrates a block diagram of an example, non-limiting system 1600 including a tuning component that can facilitate improved deep learning image processing in accordance with one or more embodiments described herein. As shown, the system 1600 can, in some cases, comprise the same components as the system 1300, and can further comprise a tuning component 1602.

In various embodiments, the tuning component 1602 can electronically alter or modify the transformed medical image 904, by adjusting one or more of the set of region-wise parameter maps 204. More specifically, the tuning component 1602 can multiplicatively scale (e.g., up or down) one or more of the set of region-wise parameter maps 204. Because the transformed medical image 904 can be based on the set of region-wise parameter maps 204, such multiplicative scaling can alter the intensity values and thus the appearance or visual characteristics of the transformed medical image 904.

As a non-limiting example, the tuning component 1602 can multiply the region-wise parameter map 204(1) by any suitable positive scalar value. If such positive scalar value is greater than 0 and less than 1, such multiplication can cause the magnitudes of the parameters in the region-wise parameter map 204(1) (e.g., can cause the parameters 204(1)(1) to the parameter 204(1)(n)) to get smaller (e.g., to get closer to zero). On the other hand, if such positive scalar value is greater than 1, such multiplication can cause the magnitudes of the parameters in the region-wise parameter map 204(1) (e.g., can cause the parameters 204(1)(1) to the parameter 204(1)(n)) to get larger (e.g., to get farther from zero). In any case, by altering the region-wise parameter map 204(1), the intensity values, and thus the visual appearance, of the transformed medical image 904 can change. In other words, the transformed medical image 904 can be re-computed by the transformation component 114 using the altered or scaled version of the region-wise parameter map 204(1) and can be re-rendered by the display component 116.

As another non-limiting example, the tuning component 1602 can multiply the region-wise parameter map 204(p) by any suitable positive scalar value. Again, if such positive scalar value is greater than 0 and less than 1, such multiplication can cause the magnitudes of the parameters in the region-wise parameter map 204(p) (e.g., can cause the parameters 204(p)(1) to the parameter 204(p)(n)) to get smaller (e.g., to get closer to zero). On the other hand, if such positive scalar value is greater than 1, such multiplication can cause the magnitudes of the parameters in the region-wise parameter map 204(p) (e.g., can cause the parameters 204(p)(1) to the parameter 204(p)(n)) to get larger (e.g., to get farther from zero). In any case, by altering the region-wise parameter map 204(p), the intensity values, and thus the visual appearance, of the transformed medical image 904 can change. In other words, the transformed medical image 904 can be re-computed by the transformation component 114 using the altered or scaled version of the region-wise parameter map 204(p) and can be re-rendered by the display component 116.

In various aspects, the tuning component 1602 can alter (e.g., via multiplicative scaling) any of the set of region-wise parameter maps 204, in response to any suitable user-input. For example, a user, technician, or medical professional can select (e.g., via any suitable human-computer interface device, such as a keyboard, keypad, mouse, touchscreen, or voice command) one or more of the set of region-wise parameter maps 204 and can indicate (e.g., again, by any suitable human-computer interface device) by how much such selected region-wise parameter maps should be multiplicatively scaled up or down, and the tuning component 1602 can implement such multiplicative scaling accordingly. In this way, the tuning component 1602 can be considered as increasing a level of end-user customizability of the transformed medical image 904.

Although not explicitly shown in the figures, note that, in various embodiments, region-wise parameter maps as described herein can be implemented in conjunction with pixel-wise or voxel-wise parameter maps. As a non-limiting example, suppose that a first deep learning neural network is configured to generate a total of e pixel-wise or voxel-wise parameter maps, for any suitable positive integer e>1. Now, suppose that a second deep learning neural network is configured to generate a total of $e_{pix/vox}$ pixel-wise or voxel-wise parameter maps and a total of $e_{reg}$ region-wise parameter maps, for any suitable positive integers $e_{pix/vox}$ and $e_{reg}$ where $e_{pix/vox} + e_{reg} = e$. In such case, each of the first deep learning neural network and the second deep learning neural network can generate a total of e parameter maps. However, the first deep learning neural network can have a larger footprint (e.g., in some cases, orders of magnitude larger) than the second deep learning neural network, since some of the e total parameter maps generated by the second deep learning neural network can be region-wise, and since none of the e total parameter maps generated by the first deep learning neural network can be region-wise. Accordingly, the deep learning neural network 202 can, in some embodiments, be configured to generate a set of pixel-wise or voxel-wise parameter maps in conjunction with the set of region-wise parameter maps 204.

Figure 17:
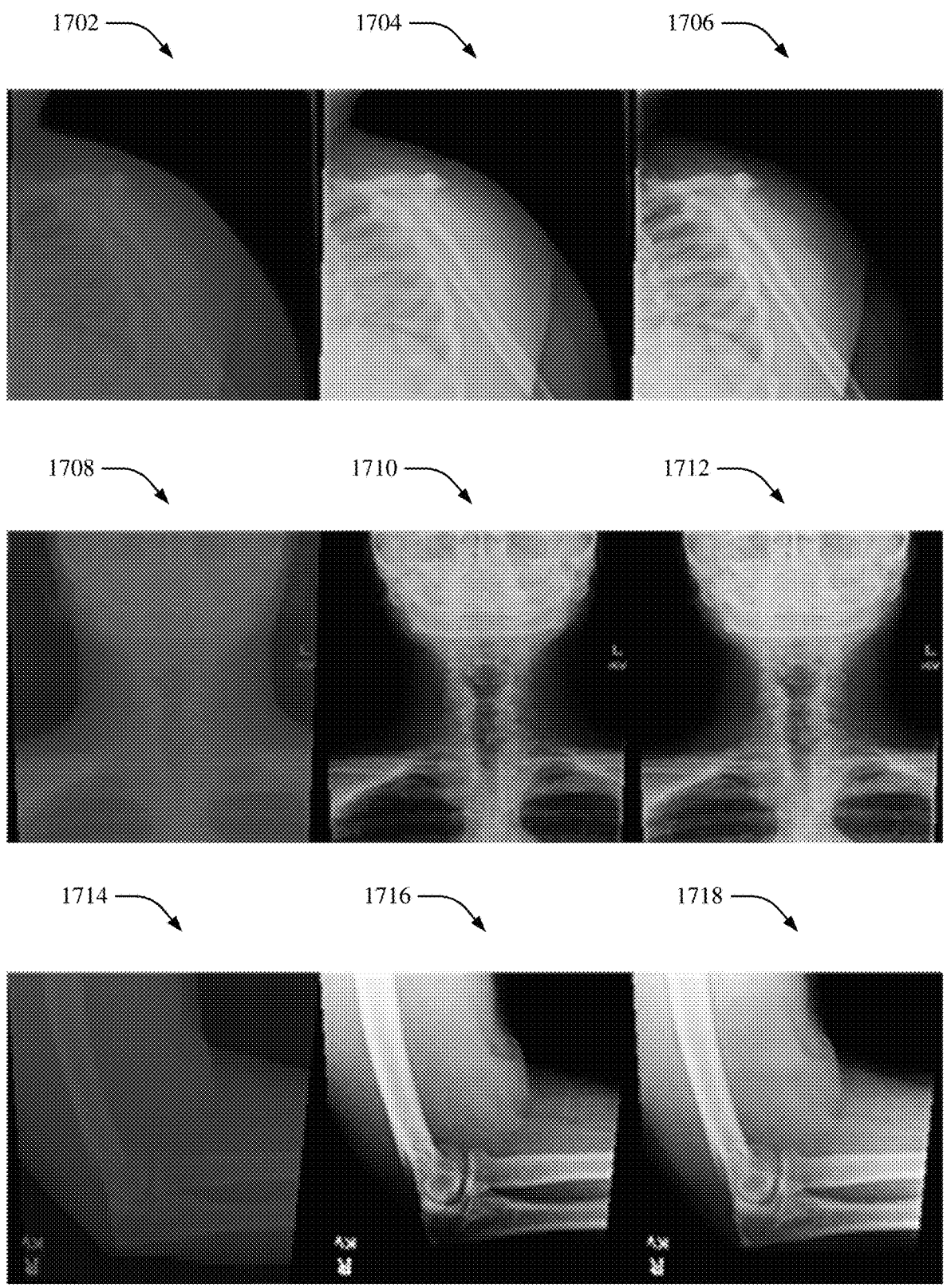
FIG. 17 illustrates example, non-limiting experimental results in accordance with one or more embodiments described herein.

FIG. 17 illustrates example, non-limiting experimental results in accordance with one or more embodiments described herein. In particular, the present inventors reduced to practice an example, non-limiting embodiment of the image processing system 102 described herein that was configured to facilitate brightness-contrast enhancement and tissue-equalization on inputted CT scanned images. FIG. 17 depicts various of such inputted CT scanned images, ground-truths that correspond to such inputted CT scanned images, and corresponding predicted/inferred transformed versions of such inputted CT scanned images produced by the example, non-limiting embodiment of the image processing system 102.

As shown, FIG. 17 illustrates a CT scanned image 1702 that depicts a shoulder of a medical patient. FIG. 17 also illustrates a ground-truth image 1704 that can be considered as a correct or accurate tissue-equalized and brightness-contrast-enhanced version of the CT scanned image 1702. Additionally, FIG. 17 illustrates a transformed image 1706 that was generated by the non-limiting example embodiment of the image processing system 102 in response to being fed the CT scanned image 1702. As can be seen, the transformed image 1706 closely matches the ground-truth image 1704.

Moreover, as shown, FIG. 17 illustrates a CT scanned image 1708 that depicts a neck of a medical patient. FIG. 17 also illustrates a ground-truth image 1710 that can be considered as a correct or accurate tissue-equalized and brightness-contrast-enhanced version of the CT scanned image 1708. Additionally, FIG. 17 illustrates a transformed image 1712 that was generated by the non-limiting example embodiment of the image processing system 102 in response to being fed the CT scanned image 1708. As can be seen, the transformed image 1712 closely matches the ground-truth image 1710.

Furthermore, as shown, FIG. 17 illustrates a CT scanned image 1714 that depicts an elbow of a medical patient. FIG. 17 also illustrates a ground-truth image 1716 that can be considered as a correct or accurate tissue-equalized and brightness-contrast-enhanced version of the CT scanned image 1714. Additionally, FIG. 17 illustrates a transformed image 1718 that was generated by the non-limiting example embodiment of the image processing system 102 in response to being fed the CT scanned image 1714. As can be seen, the transformed image 1718 closely matches the ground-truth image 1716.

These experimental results help to validate various embodiments described herein.

Figure 18:
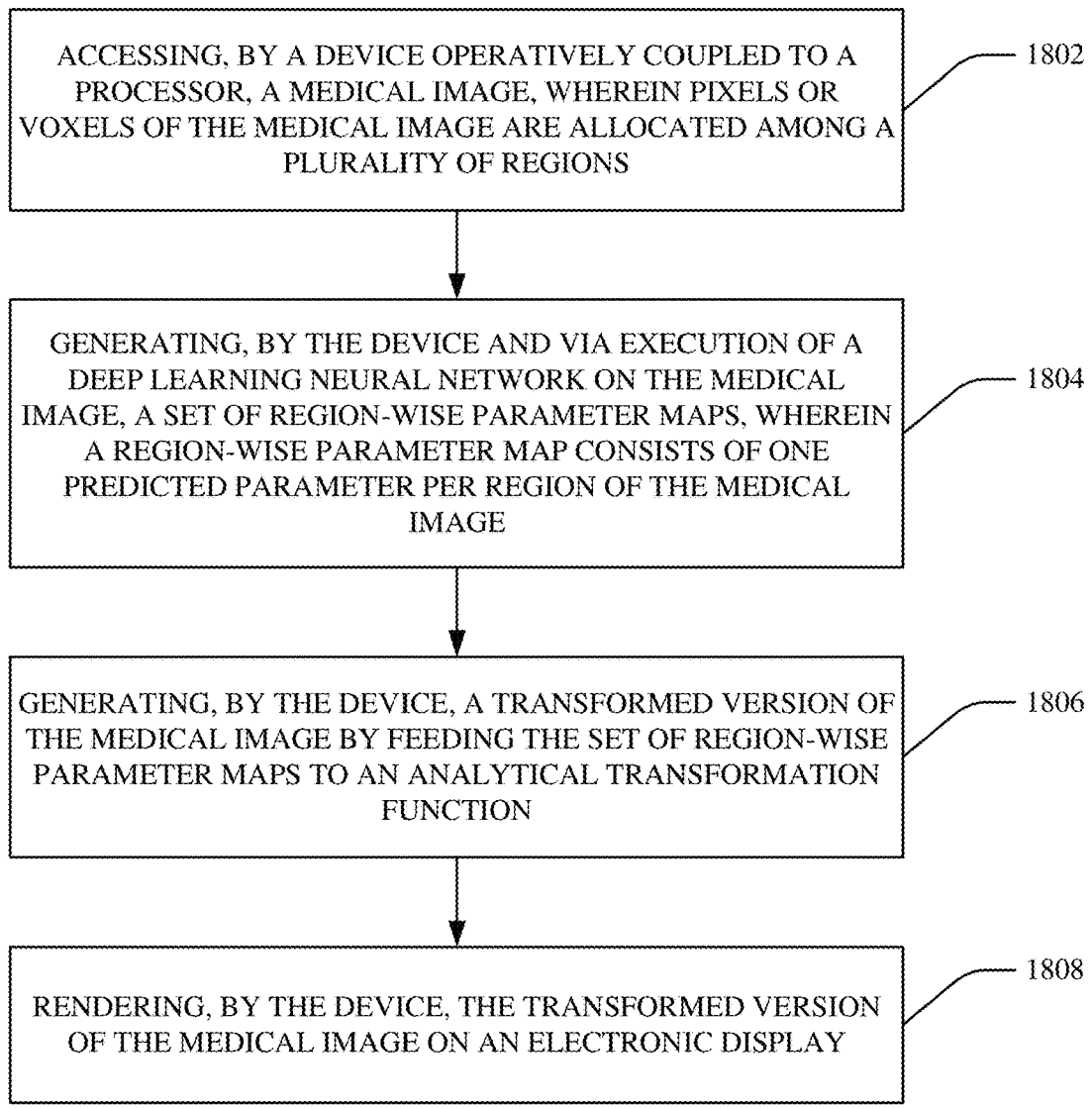
FIG. 18 illustrates a flow diagram of an example, non-limiting computer-implemented method that facilitates improved deep learning image processing in accordance with one or more embodiments described herein.

FIG. 18 illustrates a flow diagram of an example, non-limiting computer-implemented method 1800 that can facilitate improved deep learning image processing in accordance with one or more embodiments described herein. In various cases, the image processing system 102 can facilitate the computer-implemented method 1800.

In various embodiments, act 1802 can include accessing, by a device (e.g., via 110) operatively coupled to a processor (e.g., 106), a medical image (e.g., 104), wherein pixels or voxels of the medical image can be allocated among a plurality of regions (e.g., 302).

In various aspects, act 1804 can include generating, by the device (e.g., via 112) and via execution of a deep learning neural network (e.g., 202) on the medical image, a set of region-wise parameter maps (e.g., 204), wherein a region-wise parameter map can consist of one predicted parameter per region of the medical image (e.g., as shown in FIG. 3).

In various instances, act 1806 can include generating, by the device (e.g., via 114), a transformed version (e.g., 904) of the medical image by feeding the set of region-wise parameter maps to an analytical transformation function (e.g., 902).

In various cases, act 1808 can include rendering, by the device (e.g., via 116), the transformed version of the medical image on an electronic display.

Although not explicitly shown in FIG. 18, the computer-implemented method 1800 can further comprise: rendering, by the device (e.g., via 116), the set of region-wise parameter maps on the electronic display.

Although not explicitly shown in FIG. 18, the computer-implemented method 1800 can further comprise: training, by the device (e.g., via 1302), the deep learning neural network based on a training dataset (e.g., 1304), wherein the training dataset includes training medical images (e.g., 1402) and ground-truth region-wise parameter maps (e.g., 1404) corresponding to the training medical images.

Although not explicitly shown in FIG. 18, the computer-implemented method 1800 can further comprise: training, by the device (e.g., via 1302), the deep learning neural network based on a training dataset (e.g., 1304), wherein the training dataset includes training medical images (e.g., 1402) and ground-truth transformed versions (e.g., 1406) of the training medical images.

Although not explicitly shown in FIG. 18, the computer-implemented method 1800 can further comprise: altering, by the device (e.g., via 1602), the transformed version of the medical image by adjusting at least one of the set of region-wise parameter maps. In various cases, the adjusting the at least one of the set of region-wise parameter maps can be based on multiplicative scaling.

Although not explicitly shown in FIG. 18, the plurality of regions can be irregular or tissue-based.

Although the herein disclosure mainly describes various embodiments as applying to a deep learning neural network (e.g., 202), this is a mere non-limiting example. In various aspects, the herein-described teachings can be applied to any suitable machine learning models exhibiting any suitable artificial intelligence architectures (e.g., support vector machines, naïve Bayes, linear regression, logistic regression, decision trees, random forest).

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, Z_n)$, to a confidence that the input belongs to a class, as by $f(z)$=confidence(class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

The herein disclosure describes non-limiting examples. For case of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

Figure 19:
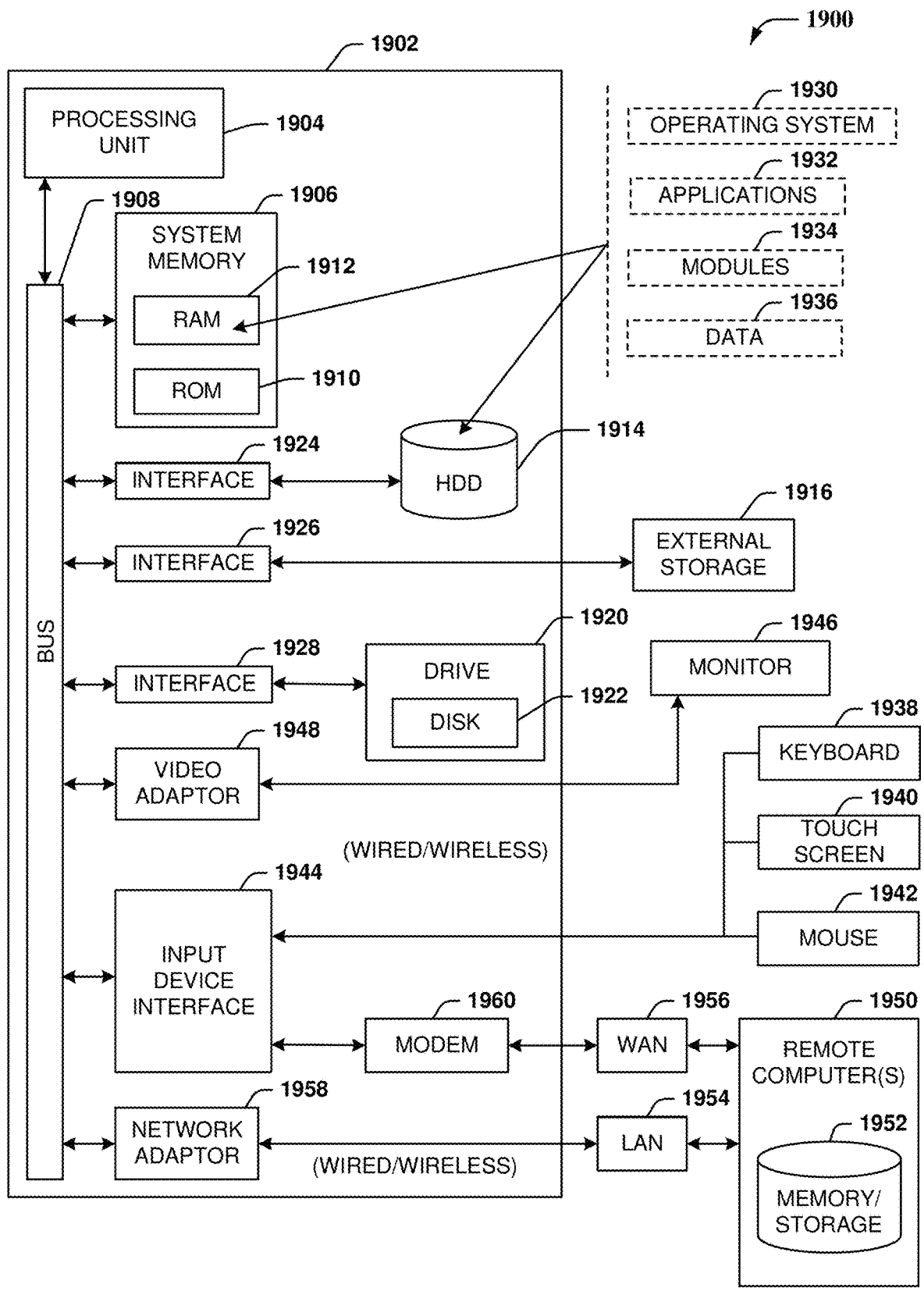
FIG. 19 illustrates a block diagram of an example, non-limiting operating environment in which one or more embodiments described herein can be facilitated.

In order to provide additional context for various embodiments described herein, FIG. 19 and the following discussion are intended to provide a brief, general description of a suitable computing environment 1900 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 19, the example environment 1900 for implementing various embodiments of the aspects described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM

1910 and RAM 1912. A basic input/output system (BIOS) can be stored in a non-volatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1914 (e.g., EIDE, SATA), one or more external storage devices 1916 (e.g., a magnetic floppy disk drive (FDD) 1916, a memory stick or flash drive reader, a memory card reader, etc.) and a drive 1920, e.g., such as a solid state drive, an optical disk drive, which can read or write from a disk 1922, such as a CD-ROM disc, a DVD, a BD, etc. Alternatively, where a solid state drive is involved, disk 1922 would not be included, unless separate. While the internal HDD 1914 is illustrated as located within the computer 1902, the internal HDD 1914 can also be configured for external use in a suitable chassis (not shown). Additionally, while not shown in environment 1900, a solid state drive (SSD) could be used in addition to, or in place of, an HDD 1914. The HDD 1914, external storage device(s) 1916 and drive 1920 can be connected to the system bus 1908 by an HDD interface 1924, an external storage interface 1926 and a drive interface 1928, respectively. The interface 1924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, or data can also be cached in the RAM 1912. The systems and methods described herein can be implemented utilizing various commercially available operating systems or combinations of operating systems.

Computer 1902 can optionally comprise emulation technologies. For example, a hypervisor (not shown) or other intermediary can emulate a hardware environment for operating system 1930, and the emulated hardware can optionally be different from the hardware illustrated in FIG. 19. In such an embodiment, operating system 1930 can comprise one virtual machine (VM) of multiple VMs hosted at computer 1902. Furthermore, operating system 1930 can provide runtime environments, such as the Java runtime environment or the .NET framework, for applications 1932. Runtime environments are consistent execution environments that allow applications 1932 to run on any operating system that includes the runtime environment. Similarly, operating system 1930 can support containers, and applications 1932 can be in the form of containers, which are lightweight, standalone, executable packages of software that include, e.g., code, runtime, system tools, system libraries and settings for an application.

Further, computer 1902 can be enable with a security module, such as a trusted processing module (TPM). For instance with a TPM, boot components hash next in time boot components, and wait for a match of results to secured values, before loading a next boot component. This process can take place at any layer in the code execution stack of computer 1902, e.g., applied at the application execution level or at the operating system (OS) kernel level, thereby enabling security at any level of code execution.

A user can enter commands and information into the computer 1902 through one or more wired/wireless input devices, e.g., a keyboard 1938, a touch screen 1940, and a pointing device, such as a mouse 1942. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1904 through an input device interface 1944 that can be coupled to the system bus 1908, but can be connected by other interfaces, such as a parallel port, an IEEE 1394 serial port, a game port, a USB port, an IR interface, a BLUETOOTH® interface, etc.

A monitor 1946 or other type of display device can be also connected to the system bus 1908 via an interface, such as a video adapter 1948. In addition to the monitor 1946, a computer typically includes other peripheral output devices (not shown), such as speakers, printers, etc.

The computer 1902 can operate in a networked environment using logical connections via wired or wireless communications to one or more remote computers, such as a remote computer(s) 1950. The remote computer(s) 1950 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1952 is illustrated. The logical connections depicted include wired/wireless connectivity to a local area network (LAN) 1954 or larger networks, e.g., a wide area network (WAN) 1956. Such LAN and WAN networking environments are commonplace in offices and companies, and facilitate enterprise-wide computer networks, such as intranets, all of which can connect to a global communications network, e.g., the Internet.

When used in a LAN networking environment, the computer 1902 can be connected to the local network 1954 through a wired or wireless communication network interface or adapter 1958. The adapter 1958 can facilitate wired or wireless communication to the LAN 1954, which can also include a wireless access point (AP) disposed thereon for communicating with the adapter 1958 in a wireless mode.

When used in a WAN networking environment, the computer 1902 can include a modem 1960 or can be connected to a communications server on the WAN 1956 via other means for establishing communications over the WAN 1956, such as by way of the Internet. The modem 1960, which can be internal or external and a wired or wireless device, can be connected to the system bus 1908 via the input device interface 1944. In a networked environment, program modules depicted relative to the computer 1902 or portions thereof, can be stored in the remote memory/storage device 1952. It will be appreciated that the network connections shown are example and other means of establishing a communications link between the computers can be used.

When used in either a LAN or WAN networking environment, the computer 1902 can access cloud storage systems or other network-based storage systems in addition to, or in place of, external storage devices 1916 as described above, such as but not limited to a network virtual machine providing one or more aspects of storage or processing of information. Generally, a connection between the computer 1902 and a cloud storage system can be established over a LAN 1954 or WAN 1956 e.g., by the adapter 1958 or modem 1960, respectively. Upon connecting the computer 1902 to an associated cloud storage system, the external storage interface 1926 can, with the aid of the adapter 1958 or modem 1960, manage storage provided by the cloud storage system as it would other types of external storage. For instance, the external storage interface 1926 can be configured to provide access to cloud storage sources as if those sources were physically connected to the computer 1902.

The computer 1902 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 20:
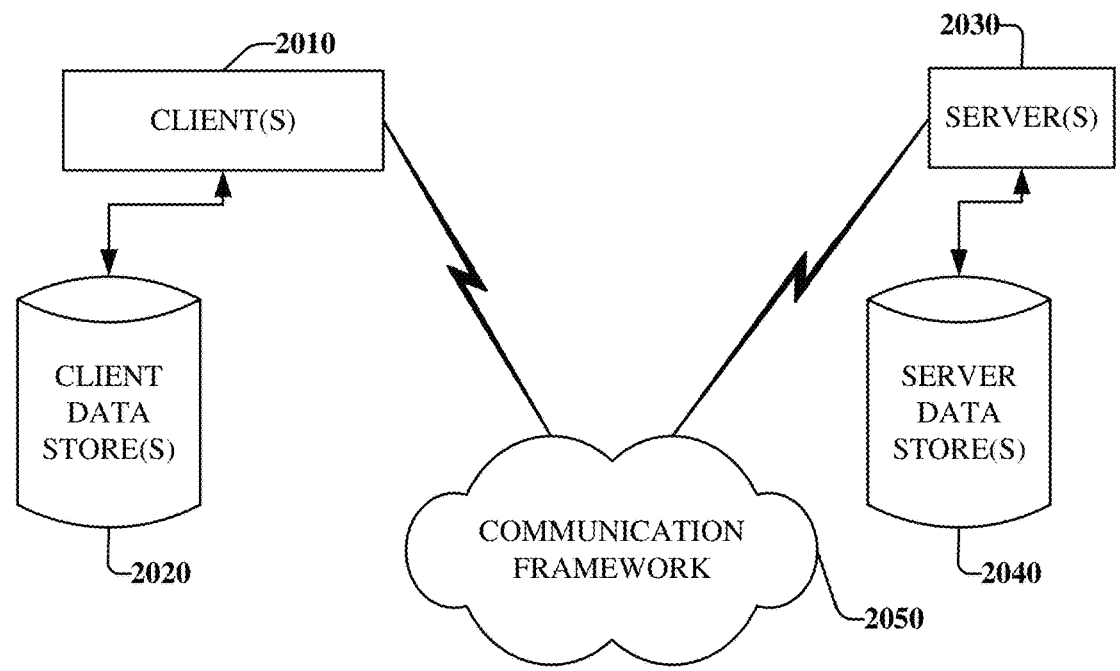
FIG. 20 illustrates an example networking environment operable to execute various implementations described herein.

FIG. 20 is a schematic block diagram of a sample computing environment 2000 with which the disclosed subject matter can interact. The sample computing environment 2000 includes one or more client(s) 2010. The client(s) 2010 can be hardware or software (e.g., threads, processes, computing devices). The sample computing environment 2000 also includes one or more server(s) 2030. The server(s) 2030 can also be hardware or software (e.g., threads, processes, computing devices). The servers 2030 can house threads to perform transformations by employing one or more embodiments as described herein, for example. One possible communication between a client 2010 and a server 2030 can be in the form of a data packet adapted to be transmitted between two or more computer processes. The sample computing environment 2000 includes a communication framework 2050 that can be employed to facilitate communications between the client(s) 2010 and the server(s) 2030. The client(s) 2010 are operably connected to one or more client data store(s) 2020 that can be employed to store information local to the client(s) 2010. Similarly, the server(s) 2030 are operably connected to one or more server data store(s) 2040 that can be employed to store information local to the servers 2030.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a processor that executes computer-executable components stored in a non-transitory computer-readable memory, the computer-executable components comprising:
        an access component that accesses a medical image, wherein pixels or voxels of the medical image are allocated among a plurality of regions;
        an inference component that generates, via execution of a deep learning neural network on the medical image, a set of region-wise parameter maps, wherein a region-wise parameter map consists of one predicted parameter per region of the medical image;
        a transformation component that generates a transformed version of the medical image by feeding the set of region-wise parameter maps to an analytical transformation function; and
        a display component that renders the transformed version of the medical image on an electronic display.

2. The system of claim 1, wherein the display component renders the set of region-wise parameter maps on the electronic display.

3. The system of claim 1, wherein the computer-executable components further comprise:
    a training component that trains the deep learning neural network based on a training dataset, wherein the training dataset includes training medical images and ground-truth region-wise parameter maps corresponding to the training medical images.

4. The system of claim 1, wherein the computer-executable components further comprise:
    a training component that trains the deep learning neural network based on a training dataset, wherein the training dataset includes training medical images and ground-truth transformed versions of the training medical images.

5. The system of claim 1, wherein the computer-executable components further comprise:
    a tuning component that alters the transformed version of the medical image by adjusting at least one of the set of region-wise parameter maps.

6. The system of claim 5, wherein the tuning component adjusts the at least one of the set of region-wise parameter maps via multiplicative scaling.

7. The system of claim 1, wherein the plurality of regions are irregular or tissue-based.

8. A computer-implemented method, comprising:
    accessing, by a processor, a medical image, wherein pixels or voxels of the medical image are allocated among a plurality of regions;
    generating, by the processor and via execution of a deep learning neural network on the medical image, a set of region-wise parameter maps, wherein a region-wise parameter map consists of one predicted parameter per region of the medical image;
    generating, by the processor, a transformed version of the medical image by feeding the set of region-wise parameter maps to an analytical transformation function; and
    rendering, by the processor, the transformed version of the medical image on an electronic display.

9. The computer-implemented method of claim 8, further comprising:
rendering, by the processor, the set of region-wise parameter maps on the electronic display.

10. The computer-implemented method of claim 8, further comprising:
training, by the processor, the deep learning neural network based on a training dataset, wherein the training dataset includes training medical images and ground-truth region-wise parameter maps corresponding to the training medical images.

11. The computer-implemented method of claim 8, further comprising:
training, by the processor, the deep learning neural network based on a training dataset, wherein the training dataset includes training medical images and ground-truth transformed versions of the training medical images.

12. The computer-implemented method of claim 8, further comprising:
altering, by the processor, the transformed version of the medical image by adjusting at least one of the set of region-wise parameter maps.

13. The computer-implemented method of claim 12, wherein the adjusting the at least one of the set of region-wise parameter maps is based on multiplicative scaling.

14. The computer-implemented method of claim 8, wherein the plurality of regions are irregular or tissue-based.

15. A computer program product for facilitating improved deep learning image processing, the computer program product comprising a non-transitory computer-readable memory having program instructions embodied therewith, the program instructions executable by a processor to cause the processor to:
access a medical image, wherein pixels or voxels of the medical image are allocated among a plurality of regions;
generate, via execution of a deep learning neural network on the medical image, a set of region-wise parameter maps, wherein a region-wise parameter map consists of one predicted parameter per region of the medical image;
generate a transformed version of the medical image by feeding the set of region-wise parameter maps to an analytical transformation function; and
render the transformed version of the medical image on an electronic display.

16. The computer program product of claim 15, wherein the program instructions are further executable to cause the processor to:
render the set of region-wise parameter maps on the electronic display.

17. The computer program product of claim 15, wherein the program instructions are further executable to cause the processor to:
train the deep learning neural network based on a training dataset, wherein the training dataset includes training medical images and ground-truth region-wise parameter maps corresponding to the training medical images.

18. The computer program product of claim 15, wherein the program instructions are further executable to cause the processor to:
train the deep learning neural network based on a training dataset, wherein the training dataset includes training medical images and ground-truth transformed versions of the training medical images.

19. The computer program product of claim 15, wherein the program instructions are further executable to cause the processor to:
alter the transformed version of the medical image by adjusting at least one of the set of region-wise parameter maps.

20. The computer program product of claim 19, wherein the processor modifies the at least one of the set of region-wise parameter maps via multiplicative scaling.

* * * * *